(12) United States Patent
Sugaya et al.

(10) Patent No.: US 7,068,676 B1
(45) Date of Patent: Jun. 27, 2006

(54) WIRELESS TERMINAL DEVICE AND NODE DEVICE

(75) Inventors: Tetsu Sugaya, Kawasaki (JP); Makoto Inami, Kawasaki (JP); Eiichiro Takahashi, Kawasaki (JP); Tomohiro Ishihara, Kawasaki (JP); Kazutoshi Motohashi, Kawasaki (JP); Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/558,954

(22) Filed: Apr. 26, 2000

(30) Foreign Application Priority Data

Apr. 30, 1999  (JP) ................................. 11-124397

(51) Int. Cl.
*H04L 12/42* (2006.01)
*H04Q 7/00* (2006.01)

(52) U.S. Cl. .................. 370/445; 370/329; 370/437; 370/477

(58) Field of Classification Search ................ 370/310, 370/331–335, 455, 469; 455/436–439, 453
See application file for complete search history.

(56) References Cited

U.S. PATENT DOCUMENTS

| | | | |
|---|---|---|---|
| 5,249,181 A * | 9/1993 | Wang et al. | 370/347 |
| 5,343,512 A * | 8/1994 | Wang et al. | 455/410 |
| 5,371,734 A | 12/1994 | Fischer | |
| 5,864,558 A | 1/1999 | Johnson | |
| 6,442,151 B1 * | 8/2002 | H'mimy et al. | 370/333 |
| 6,501,736 B1 * | 12/2002 | Smolik et al. | 370/252 |
| 6,542,742 B1 * | 4/2003 | Schramm et al. | 455/436 |
| 6,590,928 B1 * | 7/2003 | Haartsen | 375/134 |

FOREIGN PATENT DOCUMENTS

| | | |
|---|---|---|
| JP | 8065303 A | 3/1996 |
| JP | 8065304 A | 3/1996 |
| JP | 8065305 A | 3/1996 |
| JP | 8065306 A | 3/1996 |
| JP | 09064870 A | 3/1997 |

(Continued)

OTHER PUBLICATIONS

IEEE Standard Part 11: Wireless LAN Medium Access Control (MAC) and Physical Layer (PHY) Specification. IEEE STD 802.11-1997 Online! Jun. 26, 1997; Introduction & Chapter 9 URL:http://ieeexplore.ieee.org/iel4/5258/14251/00654749.pdf?isNumber=14251&prod=STD &arnumber=654749&arST=i&ared=445&arAuthor=> pp. 71-99; XP-002249131.

(Continued)

*Primary Examiner*—Huy D. Vu
*Assistant Examiner*—Justin M. Philpott
(74) *Attorney, Agent, or Firm*—Katten Muchin Rosenman LLP

(57) ABSTRACT

A wireless terminal device includes a wireless interface part having an interface with a wireless transmission path at a physical layer, a link forming part accessing the wireless transmission path via the wireless interface unit and forming a particular link on the wireless transmission path, and a transmission/reception part transmitting and/or receiving transmission information via the particular link formed by the link forming part. The wireless transmission path is formed as a physical channel to which a CSMA system is applied. The CSMA system secures a given transmission quality with respect to a total of the number of links concurrently formable and the amount of the transmission information. The link forming part forms the particular link on the wireless transmission path when initiated.

12 Claims, 18 Drawing Sheets

FOREIGN PATENT DOCUMENTS

| | | |
|---|---|---|
| JP | 09102944 A | 4/1997 |
| JP | 09 130405 A | 5/1997 |
| JP | 09139933 A | 5/1997 |
| JP | 09200732 A | 7/1997 |
| JP | 09231285 A | 9/1997 |
| JP | 09327076 A | 12/1997 |
| JP | 10-51836 | 2/1998 |
| JP | 10032610 A | 2/1998 |
| JP | 10032866 A | 2/1998 |
| JP | 10112694 A | 4/1998 |
| JP | 10124291 A | 5/1998 |
| JP | 10126852 A | 5/1998 |
| JP | 10133847 A | 5/1998 |
| JP | 10134047 A | 5/1998 |
| JP | 10136427 A | 5/1998 |
| JP | 10177468 A | 6/1998 |
| JP | 10177469 A | 6/1998 |
| JP | 10190865 A | 7/1998 |
| JP | 10190880 A | 7/1998 |
| JP | 10224291 A | 8/1998 |
| JP | 10257103 A | 9/1998 |
| JP | 10262285 A | 9/1998 |
| JP | 10271106 A | 10/1998 |
| JP | 10289177 A | 10/1998 |
| JP | 10294962 A | 11/1998 |
| JP | 10304096 A | 11/1998 |
| JP | 10307766 A | 11/1998 |
| JP | 10307794 A | 11/1998 |
| JP | 10308779 A | 11/1998 |

OTHER PUBLICATIONS

"Broadband Radio Access Networks (BRAN); Inventory of Broadband Radio Technologies and Techniques" ETSI TR 101 173 V1.1.1 Online! May 1998; XP002249132 URL:http://webapp.etsi.org/exchangefolder/tr_101173v010101p.pdf.

"Broadband Radio Access Networks (BRAN); High Performance Radio Local Area Network (HIPERLAN) Type 2; Requirements and Architectures for Wireless Broadband Access" ETSI TR 101 031 V2.2.1 Online! Jan. 1999; XP002249214 URL:http://webapp.etsi.org/exchangefolder/tr_101031v020201p.pdf.

\* cited by examiner

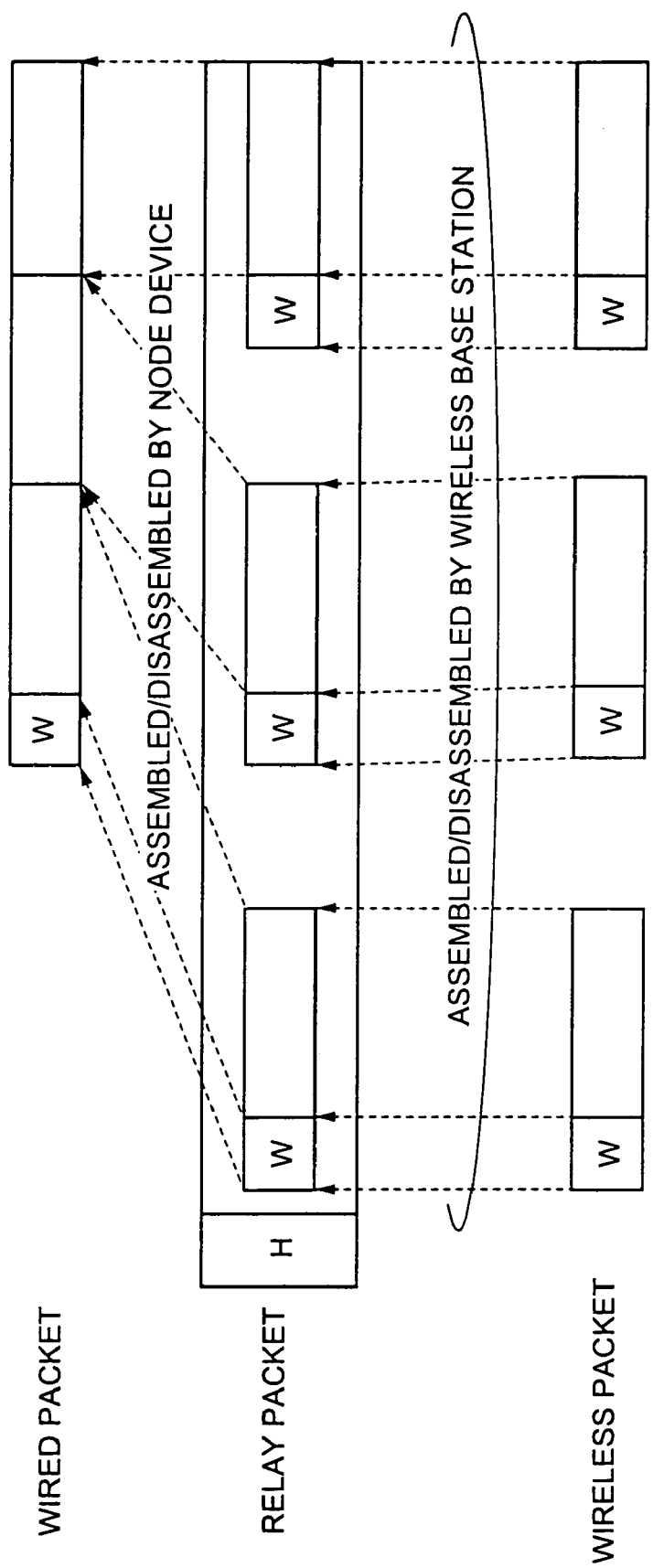

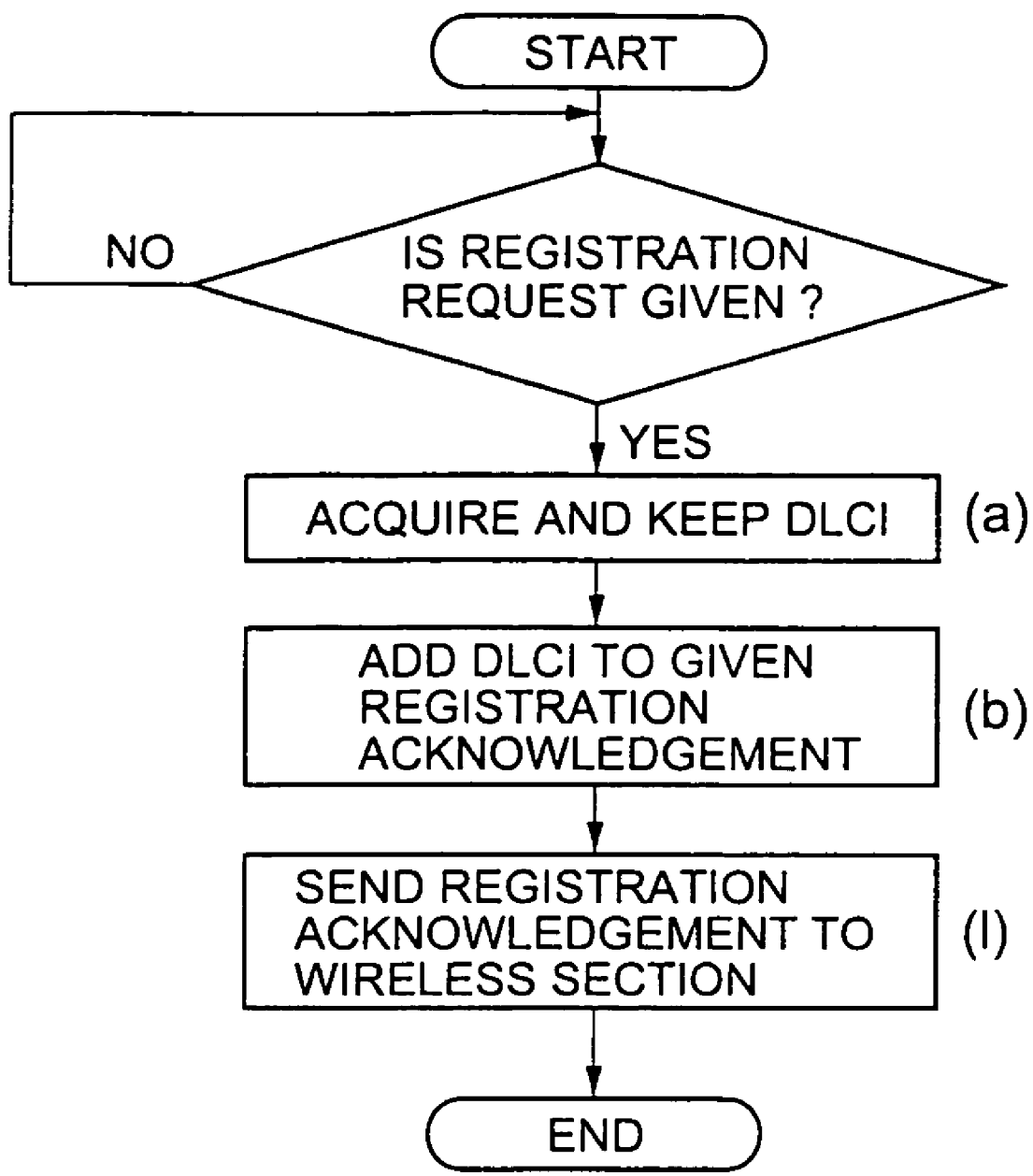

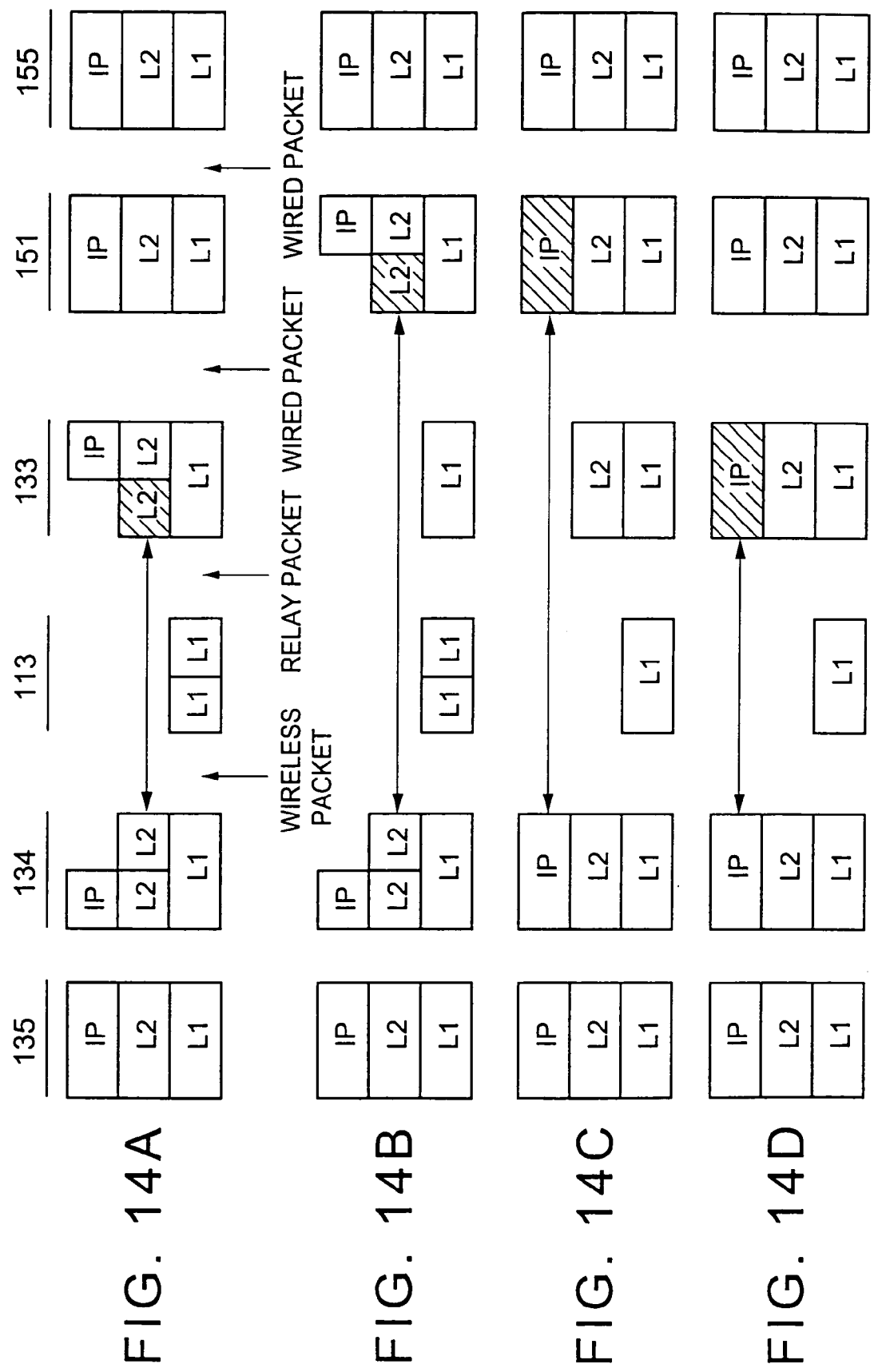

WIRELESS TERMINAL DEVICE AND NODE DEVICE

BACKGROUND OF THE INVENTION

1. Field of the Invention

The present invention relates to a wireless terminal device that is accommodated via a wireless transmission medium and is used to receive desired communication services. The present invention is also concerned with a node device that performs a communication control necessary for providing communication services.

2. Description of the Related Art

Recently, there has been considerable activity in cost reduction of information terminals such as personal computers as the performance thereof has been improved. In many offices, many people use information terminals so that many works are performed efficiently.

In many offices furnished with many information terminals, a LAN (Local Area Network) is introduced in order to integrally manage information and share peripheral devices. Further, a wireless LAN is placed in practice in order to achieve frequent change and flexibility of layout.

FIG. 1 shows an example of a communication system made up of an access network corresponding to a wireless LAN, and a core network connected thereto. An access network 130 and a core network 150 are mutually connected via a communication link 170.

The access network 130 includes a number N of base station devices 131-1–131-M, a base station control device 133, a wireless terminal device 134, and a personal computer (PC) 135. The base station devices 131-1–131-M are connected to the base station control device 133 via given communication links 132. The wireless terminal device 134 is located in any of wireless zones respectively formed by the base station devices 131-1–131-M. The personal computer 135 is connected to the wireless terminal device 134.

The base station control device 133 is made up of a base station interface (hereinafter simply referred to as BSI) unit 136, a core network interface (hereinafter simply referred to as CNI) unit 137, and a controller 138 connected to control terminals of the BSI unit 136 and the CNI unit 137. The BSI unit 136 is connected to ends of the communication links 132. The CNI unit 137 is connected between the BSI unit 136 and one end of the communication link 170.

The wireless terminal device 134 is made up of a terminal interface unit 139, an antenna 140, and a wireless interface unit 141, and a controller 142. The terminal interface unit 139 is connected to the personal computer 135. The wireless interface unit 141 is connected between a power supply terminal of the antenna 140 and the terminal interface unit 139. The controller 142 is connected to control terminals of the terminal interface unit 139 and the wireless interface unit 141.

The core network 150 is made up of a node device 151, one or a plurality of node devices 153-1–153-N, a home location register (hereinafter simply referred to as HLR) 154, and a default forwarder (hereinafter simply referred to as DF) 155. The node device 151 is connected to the other end of the communication link 170. The node devices 153-1–153-N are provided in a ring-shaped transmission network 152.

A personal computer 156 is connected to the node device 153-N.

The node device 151 is made up of an access network interface (hereinafter referred to as ANI) unit 157, a transmission network interface (hereinafter referred to as TNI) unit 158, and a controller 159. The ANI interface 157 is connected to the other end of the communication link 170. The TNI interface 158 is connected to a preceding transmission section of the transmission network 152 and a following transmission section thereof. The controller 159 is connected to control terminals of the ANI unit 157 and the TNI unit 158.

Each of the structures of the node devices 153-1–153-N is the same as that of the node device 151.

In the following description it is assumed that the wireless terminal device 134 is a wireless LAN interface card attached to a PCMCIA slot of the personal computer 135 for the sake of simplicity.

The terminal interface unit 139 of the wireless terminal device 134 receives a call request issued by the personal computer 135, and sends it to the controller 142. The controller 142 determines, at step (1) of FIG. 2, whether the call request is a regular request which includes identification information on the personal computer 135 that issues the call request, a telephone number of an access point to be accessed, an address of a desired site, and so on.

When the answer of step (1) is YES, the controller 142 sends the information included in the call request to the wireless interface unit 141, so that the wireless interface unit 141 is initiated (step (2)).

At step (3), the controller 142 and the wireless interface unit 141 interact with one of the base station devices 131-1–131-M which forms a wireless zone in which the wireless terminal device 134 of interest is located in order to set a channel. It is now assumed that the base station device 131-1 is involved in the wireless terminal device 134 of interest.

The base station device 131-1 performs channel setting under the control of the base station control device 133 connected thereto via the corresponding communication link 132. The base station control device 133 interacts with the node device 151 which faces the base station control device 133 via the communication link 170 in accordance with the sequence of channel setting. Thereby, a call setup arising from the call request is performed in parallel at step (1) of FIG. 3. The above channel setting is performed in order to form a logical channel to be supplied for transmission of a communication signal in a wireless section which will be described later.

In the process of the above-mentioned channel setting and call setting, the controller 138 provided in the base station control device 133 absorbs, via the BSI unit 136 and the CNI unit 137, the difference in the signal formation between the wireless transmission channel formed by the base station device 131-1 and the communication link 170.

In the wireless terminal device 134, the controller 142 acknowledges that a wireless channel has been assigned to its own station when the channel setting is duly performed. Then, the controller 142 forms a path between the antenna 140 and the personal computer 135 via the wireless interface unit 141 and the terminal interface unit 139 at step (4) shown in FIG. 2.

In the above state, a two-way communication path is formed in the transmission section (hereinafter simply referred to as wireless section) extending to the base station control device 133 via the wireless interface unit 141, the wireless transmission path, the base station device 131-1 and the communication link 132.

The base station control device 133 (controller 138), and the node devices 151, 153-1 through 153-N (controller 159 and 159-1–159-N), the HLR 154 and the DF 155 act as a router which performs routing of packets supplied via the communication link 170.

In the wireless terminal device 134, the controller 142 communicates with the base station control device 133 with the following messages based on TCP/IP after the sequence of channel setting is duly completed. Thereby a connection is established.

The controller 142 creates a registration request, which includes the dial number, identification information, and authentication number of the wireless terminal device 134 of interest (step (5) shown in FIG. 2 and step (1) shown in FIG. 5).

In the base station control device 133, the controller 138 acknowledges the registration request, and then sends, as a packet, via the communication link 170 a terminal information request related to a mobile station and comprised of the dial number, identification information and authentication number included in the registration request (step (2) shown in FIG. 3 and step (2) shown in FIG. 5).

When the HLR 154 is supplied with the terminal information request in the above-mentioned routing, it obtains terminal information applied to a database beforehand and related to the dial number included in the above terminal information request. The terminal information thus obtained is sent to the transmission path 152 as a packet (step (1) of FIG. 4 and step (3) of FIG. 5).

In the base station control device 133, when the controller 138 is supplied with the terminal information in the routing, it interacts with the controller 142 of the wireless terminal device 134 so that control information pertaining to the terminal information is transferred between the HLR 154 and the controller 142. Thereby, the setting of a secret-speech key to be applied to the wireless transmission path is performed in addition to the authentication (step (6) of FIG. 2, step (3) of FIG. 3, and steps (4) and (5) of FIG. 5).

Further, when the authentication and setting of the secret-speech key are completed, the controller 138 creates a registration request including the identification information on the corresponding wireless terminal device, and sends it to the communication link 170 as a packet (step (4) of FIG. 3 and step (6) of FIG. 5).

The HLR 154 is supplied with the above registration request. Then, given information included in the registration request the contents thereof are registered in the database (step (2) of FIG. 3). Thus, the mobile station having the established connection for communications is identified (step (3) of FIG. 3). Then, a registration acknowledgement indicating the above is sent to the transmission path 152 as a packet (step (4) of FIG. 4, and step (7) of FIG. 5).

The above registration acknowledgement is transmitted to the base station control device 133 in the aforementioned routing. The controller 138 of the base station control device 133 gives the registration acknowledgement to the wireless terminal device 134 via the wireless section (step (5) of FIG. 3, and step (8) of FIG. 5).

In the wireless terminal device 134, the controller 142 acquires the registration acknowledgement via the wireless interface unit 141, and recognizes it. Then, the controller 142 forms, between the personal computer 135 and the wireless transmission path (antenna 140), a path passing through the terminal interface unit 139 and the wireless interface unit 141 (step (7) of FIG. 2. Further, the controller 142 supplies a message indicating the above (hereinafter referred to as a connection establishment message) to the personal computer 135 via the terminal interface unit 139 (step (8) of FIG. 2, and step (9) of FIG. 5).

The personal computer 135 recognizes the connection acknowledgement message, and communicates with the wireless terminal device 134 while sending and receiving desired transmission information in the formation of a train of IP packets.

As described before, the main processes among the series of processes carried out by the interaction of the wireless terminal device 134, the base station device 131-1, the base station control device 133, the node device 151 and the HLR 154 will be referred to as connection process as shown in FIGS. 2 through 4.

In the process of transmission and reception of transmission information carried out based on the TCP/IP, as shown in FIG. 6, the IP layer and the TCP layer are not terminated at any of the base station device 131-1, the base station control device 133 and the node device 151. That is, the base station device 131-1, the base station control device 133 and the node device 151 merely present a link at a layer lower than the IP layer.

In the above-mentioned related art, the wireless terminal device 134 cannot receive connection-oriented communication services unless the above-mentioned connection process is performed by the interaction of the base station device 131-1, the base station control device 133, the node device 151 and the HLR 154, and the wireless channel allotted under the channel setting performed by the base station controller 138 in the connection process continues to be captured.

However, the above scheme needs a larger scale of hardware incurring higher cost as the number of wireless terminal devices which concurrently receive connection-oriented communication services increases. Even if the scheme can be implemented from technical viewpoints, it is not of practical use because the wireless channels are limited resources.

Particularly, in a case where the care network 150 corresponds to the Internet or accommodates access points providing access to the Internet, it is strongly desired to provide communication services as those of a connectionless network without destroying the arrangement in which wireless terminal devices are accommodated via the wireless communication paths.

SUMMARY OF THE INVENTION

It is an object of the present invention to provide a wireless terminal device and a node device capable of providing less-expensive connection-oriented services with a good transmission quality without greatly modifying the hardware configuration.

The above object of the present invention is a wireless terminal device comprising: a wireless interface part having an interface with a wireless transmission path at a physical layer; a link forming part accessing the wireless transmission path via the wireless interface unit and forming a particular link on the wireless transmission path; and a transmission/reception part transmitting and/or receiving transmission information via the particular link formed by the link forming part, the wireless transmission path being formed as a physical channel to which a CSMA system is applied, the CSMA system securing a given transmission quality with respect to a total of the number of links concurrently formable and the amount of the transmission information, the link forming part forming the particular link on the wireless transmission path when initiated.

The above object of the present invention is also achieved by a node device comprising: a wireless interface part having, at a physical layer, an interface with wireless transmission paths via which wireless terminal devices are accommodated; a link forming part forming, in accordance with a connectionless communication sequence, individual links respectively corresponding to the wireless terminal devices via the wireless interface parts; and a transmission/reception part transmitting and/or receiving desired transmission information via the individual links formed by said link forming part.

BRIEF DESCRIPTION OF THE DRAWINGS

Other objects, features and advantages of the present invention will become more apparent from the following detailed description when read in conjunction with the accompanying drawings, in which:

FIG. 12 is a diagram of a relationship among formats of packets used in respective transmission sections;

FIG. 13 is a flowchart of an operation of the second embodiment of the present invention;

FIGS. 14A, 14B, 14C and 14D are diagrams of protocol stacks applicable to embodiments of the present invention;

DESCRIPTION OF THE PREFERRED EMBODIMENTS

A description will be given, with reference to FIGS. 7 and 8, of the principles of the present invention.

Figure 7:
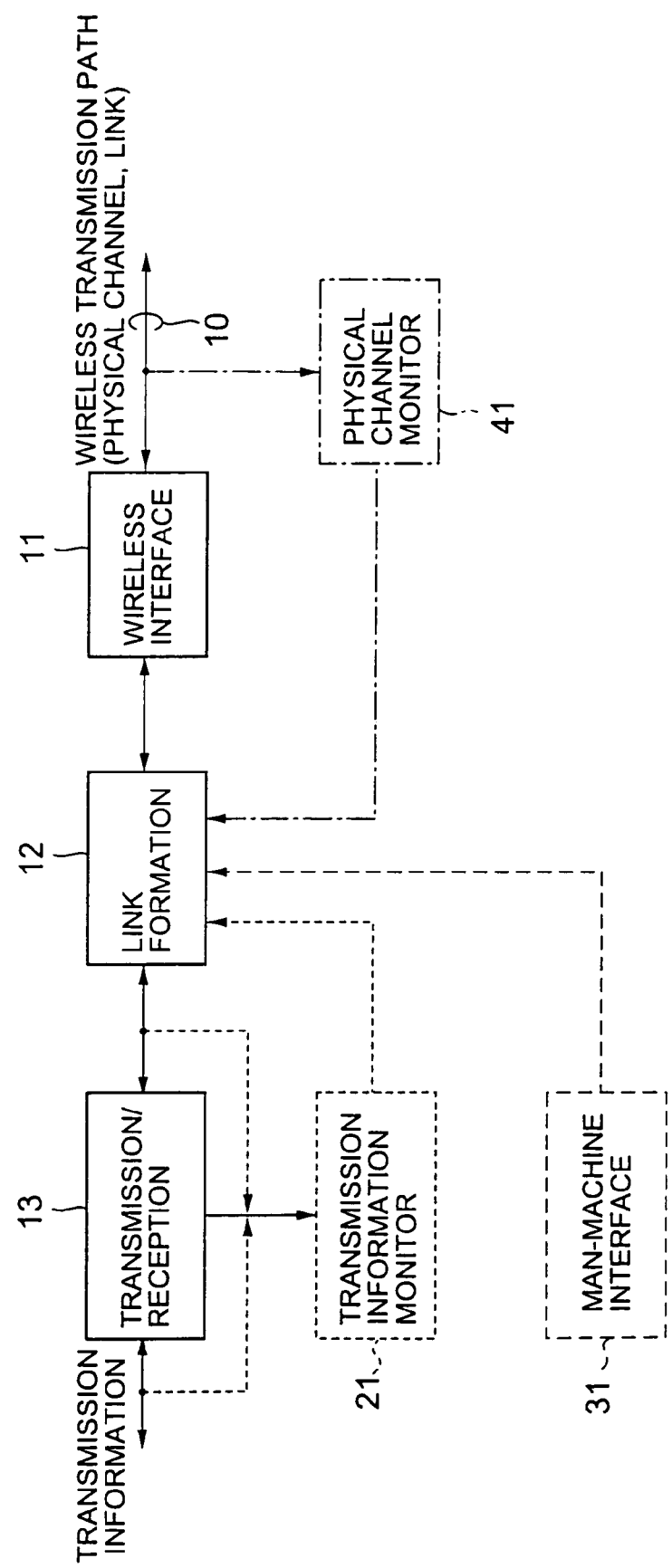
FIG. 7 is a block diagram of a principle of the present invention.

FIG. 7 shows a principle of the present invention. A wireless terminal device shown in FIG. 7 is made up of a wireless interface part 11 having an interface with a wireless transmission path 10 at a physical layer, a link forming part 12 accessing the wireless transmission path via the wireless interface unit and forming a particular link on the wireless transmission path; and a transmission/reception part 13 transmitting and/or receiving transmission information via the particular link formed by the link forming part. The wireless transmission path is formed as a physical channel to which a CSMA system is applied, the CSMA system securing a given transmission quality with respect to a total of the number of links concurrently formable and the amount of the transmission information. The link forming part forms the particular link on the wireless transmission path when initiated.

It is to be noted that the physical channel is shared via the link formed based on CSMA when the wireless terminal device starts to operate. Thus, the transmission/reception part 13 can transmit and/or receive information via the particular link formed by the link forming part 12 in accordance with a connectionless communication sequence.

The wireless terminal device may be configured so that the link forming part 12 captures resources of a single or a plurality of upper layers including a data link layer in accordance with the physical layer of the wireless transmission path 10 at the time of forming the particular link. With the above structure, the resources necessary for transmission or reception of the transmission information by the transmission/reception part 13 can be secured in advance of transmission and reception. It is thus possible to maintain a high transmission efficiency even in a case where there are limited available resources, only as many as those required to be assigned to all wireless terminal devices which concurrently transmit or receive information via individual links.

The wireless terminal device may be configured so that it further includes a transmission information monitoring part 21 for monitoring, for each link, the amount of the transmission information handled by the transmission/reception part, or an increasing rate of the amount of the transmission information. The link forming part 12 changes, as to the particular link formed in advance, a transmission capacity to a value which ensures a predetermined transmission quality in accordance with the amount of the transmission information or the increasing rate monitored by the transmission information monitoring part, and alternatively substitutes another link having another transmission capacity greater than that of the particular link. Thus, the transmission capacity of the link formed on the shared physical channel can be increased or decreased in accordance with the amount of the transmission information or the increasing rate. Alternatively, the link can be replaced by another link adequate for the amount of transmission information or the increasing rate of the link to be replaced. Thus, it is possible to flexibly cope with increase or decrease in the amount of transmission information and maintain the transmission quality.

The wireless terminal device may be configured so that it further includes a man-machine interface part 31 providing, based on a man-machine interface, an input which requests to change the transmission capacity of the particular link formed by the link forming part in advance or to substitute another link for the particular link. When the above-mentioned input is provided by the man-machine interface part, the transmission capacity of the particular link formed in advance is changed into a value which ensures a given transmission quality, or the particular link is replaced by said another link having a transmission capacity greater than that of the particular link. Thus, the operator can control increase or decrease in the transmission capacity of the link formed in the shared physical channel.

The wireless terminal device may be configured so that it further includes a physical channel monitoring part 41 monitoring one or both of a degree of congestion in a physical channel and a frequency of occurrence of a collision in the physical channel using CDMA. The link forming part 12 replaces the particular link by another link ensuring a given transmission capacity on the basis of said one or both of the degree of congestion in the physical channel and the frequency of occurrence of a collision in the physical channel. It is thus possible to replace the link formed in the shared physical channel by another adequate link based on the degree of a congestion which physically occurs in the above link or the frequency of occurrence of a collision occurring therein. As a result, it is possible to reliably maintain the transmission quality in comparison with a case where a factor which causes a need for a substitute link is determined under a communication control for the data link layer or a higher layer.

Figure 8:
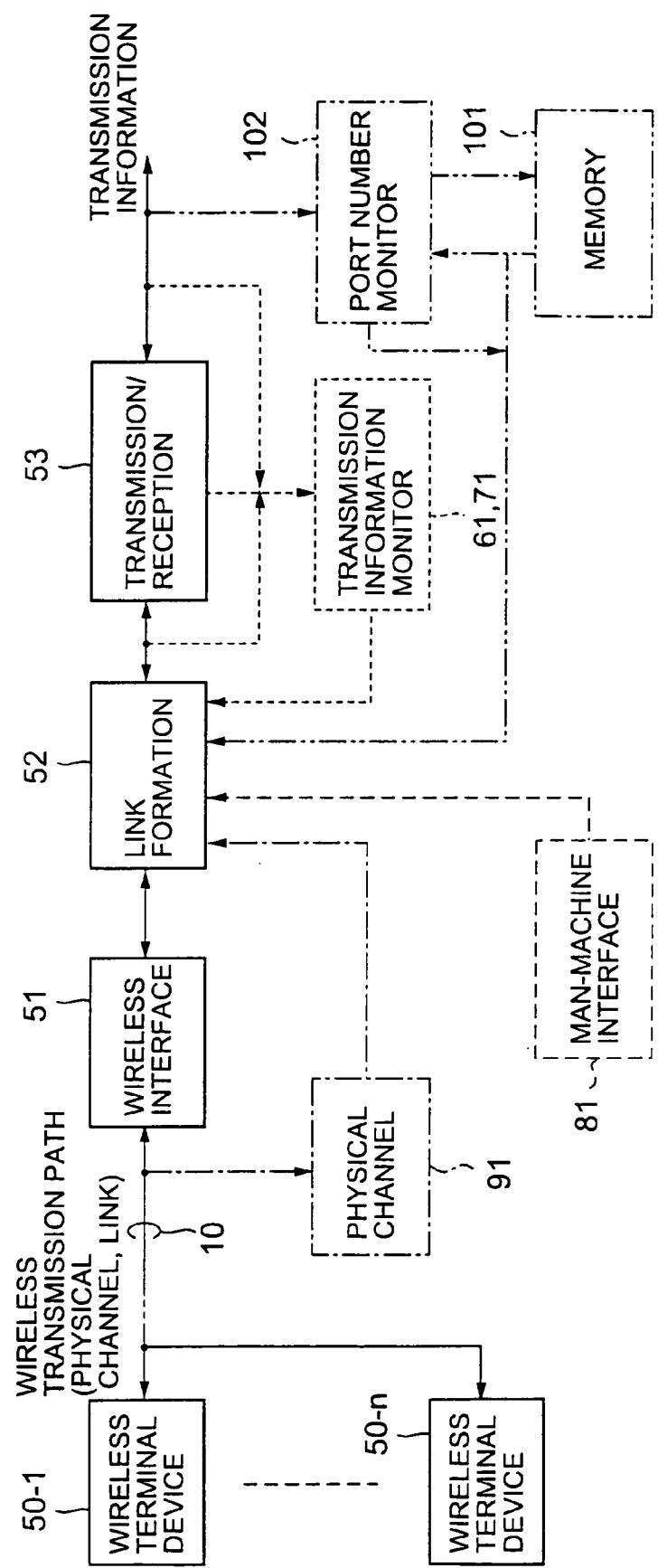
FIG. 8 is a block diagram of another principle of the present invention.

FIG. 8 is a block diagram of another principle of the present invention.

A node device shown in FIG. 8 is made up of: a wireless interface part 51 having, at a physical layer, an interface with wireless transmission paths 10 via which wireless terminal devices 50-1 through 50-*n* are accommodated; a link forming part 52 forming, in accordance with a connectionless communication sequence, individual links respectively corresponding to the wireless terminal devices via the wireless interface part; and a transmission/reception part 53 transmitting and/or receiving desired transmission information via the individual links formed by said link forming part. The physical channel forming the wireless transmission path 10 is shared by the wireless terminal devices 50-1 through 50-*n* via the links individually formed based on CSMA when the wireless terminal devices 50-1 through 50-*n* start to operate. Thus, the transmission/reception part 53 transmits or receives information via the individual links at any time.

The node device may be configured so that it further includes a transmission information monitoring part 61 which monitors, for each link, the amount of transmission information received by the transmission/reception part or an increasing rate of the amount of the transmission information received. The link forming part changes, for each of the individual links formed in advance, a transmission capacity to a value which ensures a predetermined transmission quality in accordance with the amount of the transmission information or the increasing rate monitored by the transmission information monitoring part, and alternatively substitutes another link having another transmission capacity greater than that of one of the individual links. Thus, it is possible to reliably avoid occurrence of an excessive congestion in the physical channel and frequent occurrence of a collision therein.

The node device may be configured so that it further includes a transmission information monitoring part 71 which monitors, for each of the individual links, the amount of transmission information transmitted or to be transmitted by the transmission/reception part or an increasing rate of the amount of the transmission information. The link forming part changes, for each of the individual links formed in advance, a transmission capacity to a value which ensures a predetermined transmission quality in accordance with the amount of the transmission information or the increasing rate monitored by the transmission information monitoring part, and alternatively substitutes another link having another transmission capacity greater than that of one of the individual links. Thus, it is possible to flexibly cope with increase or decrease in the amount of transmission information and reliably maintain the transmission quality even in a case where full-duplex links are formed between the node device and the wireless terminal devices 50-1 through 50-*n*.

The node device may be configured so that it further includes a man-machine interface part 81 providing, based on a man-machine interface, an input which requests to change the transmission capacity of one of the individual links formed by the link forming part in advance or to substitute another link for one of the individual links. When the above-mentioned input is provided by the man-machine interface part, the transmission capacity of one of the individual links formed in advance is changed to a value which ensures a given transmission quality, or said one of the individual links is replaced by said another link having a transmission capacity greater than that of said one of the individual links. Thus, the operator can control increase or decrease in the transmission capacity of the link formed in the shared physical channel. It is therefore possible to improve the flexibility of various works for maintenance and operation and to highly maintain total reliability.

The node device may be configured so that the transmission information monitoring parts 61, 71 monitor, as to one or both of transmission information transmitted or to be transmitted by the transmission/reception part and transmission information received thereby, the amount of the transmission information on a transmission unit basis, or an increasing rate of the amount of the transmission information. Even in a case where only the transmission information monitoring part 61, 71 handles processes related to the data link layer or a higher layer, it is possible to avoid occurrence of an excessive congestion in the physical channel and frequent occurrence of a collision therein.

The node device may be configured so that it further includes a physical channel monitoring part 91 monitoring one or both of a degree of congestion in the physical channel and a frequency of occurrence of a collision in the physical channel using CDMA. The link forming part 52 replaces one of the individual links by another link ensuring a given transmission capacity on the basis of said one or both of the degree of congestion in the physical channel and the frequency of occurrence of a collision in the physical channel. The links formed on the physical channel are replaced by other adequate links in accordance with the degree of congestion that occurs on the physical channel and the frequency of occurrence of a collision. It is thus possible to reliably maintain the transmission quality in comparison to a case where a factor which causes a need for substituting a link is determined by a communication control involved in a higher layer other than the data link layer.

The node device may be configured so that it further includes a memory part 101 which stores an amount of transmission information assigned a port number, which is added to the transmission information transmitted or received at a transport layer or a higher layer and corresponds to one or both of a transmission source of the transmission formation and a destination thereof; and a port number monitoring part 102 which acquires the port number added to the transmission information transmitted or received. The link forming part changes, based on the amount of transmission information stored in the memory part and related to the port number acquired by the port number monitoring part, a transmission capacity of one of the individual links formed in advance to a value which ensures a predetermined transmission quality in accordance with the amount of the transmission information or the increasing rate monitored by the transmission information monitoring part, and alternatively substitutes another link having another transmission capacity greater than that of one of the individual links. Generally, the port number indicates an application system which corresponds to a transmission source of transmission information and/or a destination. By acquiring the port number added to the transmission information, it is possible to promptly detect increase or decrease in the amount of transmission information and to more reliably maintain the transmission quality.

The node device may be configured so that, as to the individual links formed in advance, the link forming part communicates with the wireless terminal devices via the wireless interface part and wireless transmission paths so that control information necessary for changing transmission capacities or substituting other links for the individual links is transferred therebetween, whereby the link forming part primarily changes the transmission capacities or substitutes other links for the individual links. As compared with a case where the wireless terminal devices 50-1 through 50-n independently change the transmission capacities or substitute links for the existing links, it is possible to integrally manage the resources related to the change of the transmission capacities or the substitution of links and perform the communication control based on the common standard.

Figure 1:
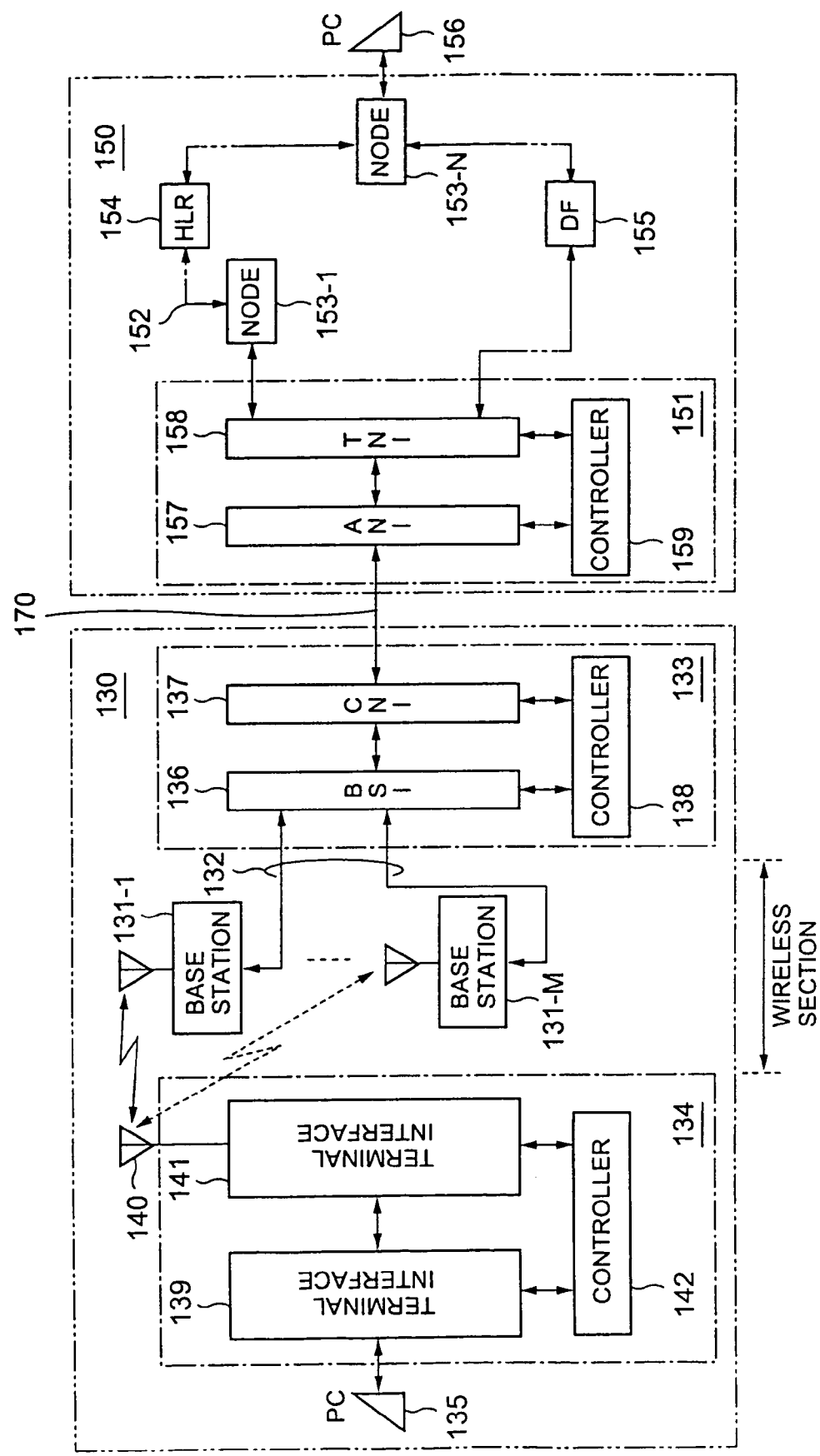
FIG. 1 is a block diagram of a communication system including an access network corresponding to a wireless LAN, and a core network.
Figure 9:
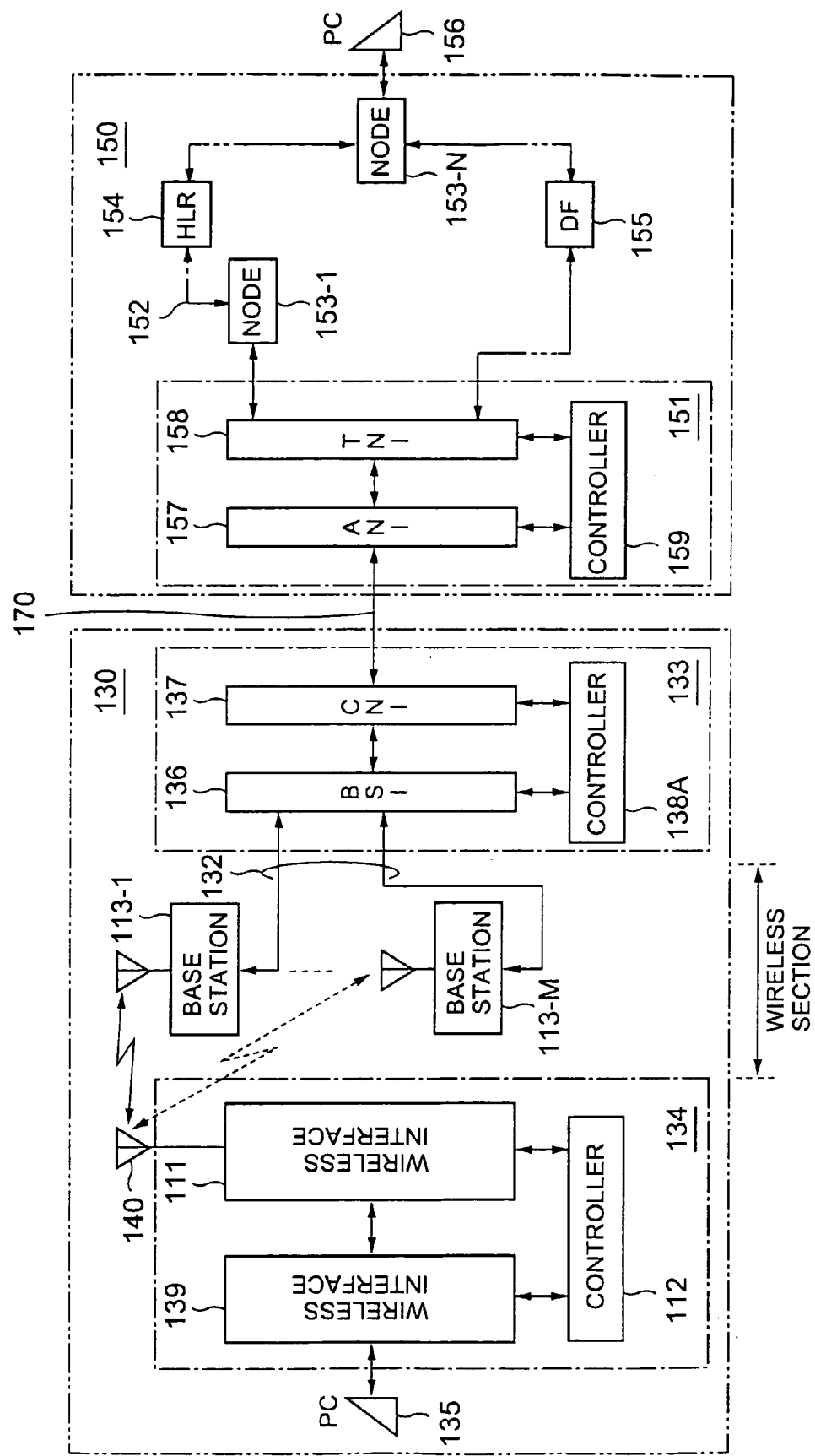
FIG. 9 is a block diagram of embodiments of the present invention.

FIG. 9 is a block diagram of a first embodiment of the present invention, in which parts having the same functions and configurations as those shown in FIG. 1 are given the same reference numbers, and a description thereof will be omitted here.

The configuration shown in FIG. 9 differs from that shown in FIG. 1 in that a wireless interface unit 111 and a controller 112 are substituted for the wireless interface unit 141 and the controller 142 of the wireless terminal device 134, respectively, and that base station devices 113-1 through 113-M are substituted for the base station devices 131-1 through 131-M, respectively. Further, a controller 138A is substituted for the controller 138 of the base station control device 133.

The configuration shown in FIG. 9 corresponds to the configurations shown in FIGS. 7 and 8 as follows. The wireless interface unit 111 corresponds to the wireless interface part 11. The controller 112 corresponds to the link forming part 12, the transmission information monitoring part 21, the man-machine interface part 31, and the physical channel monitoring part 41. The controller 112 and the terminal interface unit 139 correspond to the transmission/reception part 13. The wireless terminal device 134 corresponds to one of the wireless terminal devices 50-1 through 50-n. The base station devices 113-1 through 113-M, the communication links 132, and the BSI 136 correspond to the wireless interface part 51. The controller 138A corresponds to the link forming part 52, the transmission information monitoring parts 61 and 71, the man-machine interface part 81, the physical channel monitoring part 91, the memory part 101 and the port number monitoring part 102. The CNI 137 corresponds to the transmission/reception part 53.

Figure 10A:
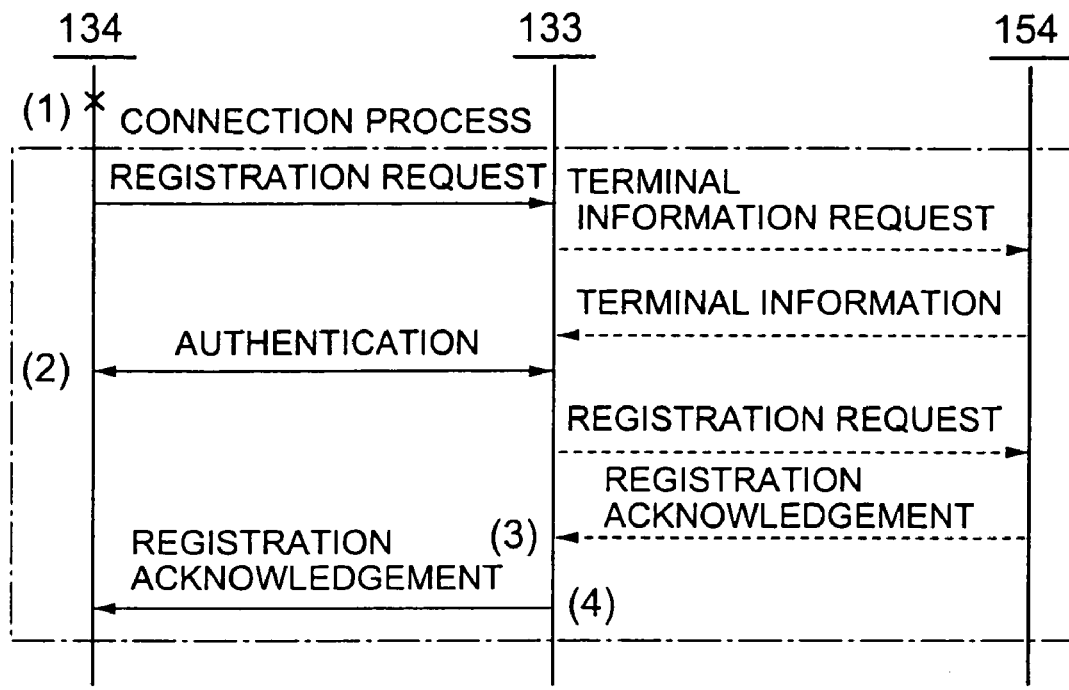
FIGS. 10A and 10B are sequence diagrams of an operation of a first embodiment of the present invention.
Figure 10B:
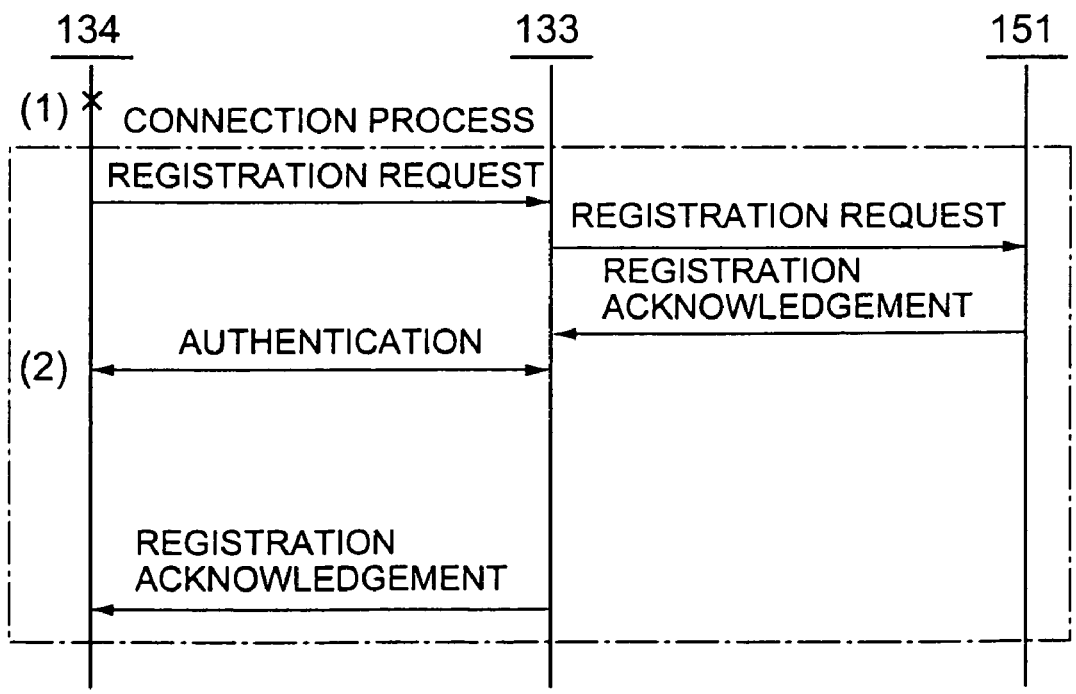
Figure 11:
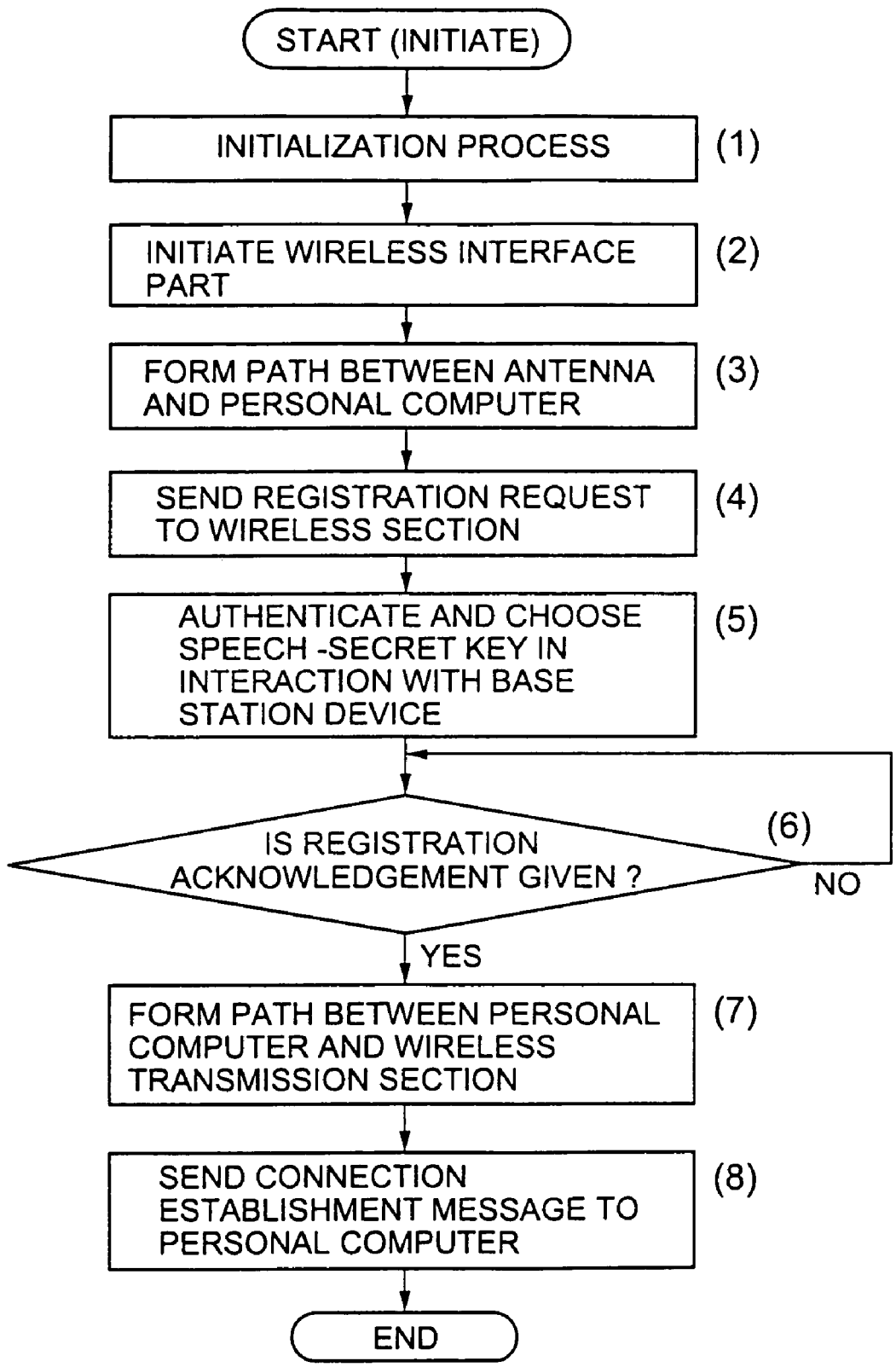
FIG. 11 is a flowchart of an operation of a wireless terminal device in the first embodiment of the present invention.

FIGS. 10A and 10B show an operation of the first embodiment of the present invention. FIG. 11 is a flowchart of an operation of the wireless terminal device according to the first embodiment of the present invention. A description will now be given, with reference to FIGS. 9, 10A, 10B and 11, of the operation of the first embodiment of the present invention.

Various messages and transmission information, which will be described later, are transmitted using any of a wireless-packet format, a relayed-packet format, and a wired packet format. These formations have mutually different formats as shown in FIG. 12. More particularly, the wireless-packet format is employed for transmission between the wireless terminal device 134 and the base station devices 113-1 through 113-M. The relayed-packet format is used for transmission between the base station devices 113-1 through 113-M and the base station control device 133 (communication links 132). The wired packet format is used for transmission between the base station control device 133 and the node device 151 (communication link 170 (the above holds true for transmission path 152)). A packet assembling and disassembling process is not directly related to the present invention, and a description thereof will be omitted.

Wireless terminal devices which can be located in wireless zones respectively formed by the base station devices 113-1 through 113-M are assigned reference numbers 134-1 through 134-n in the following description for the sake of convenience, although these reference numbers are not shown on FIG. 9.

A wireless transmission path (hereinafter referred to as shared channel) is formed by applying, to the sections between the wireless terminal devices 134-1 through 134-n and the base station devices 113-1 through 113-M, a multiple access method and a modulation method capable of securing a desired bit rate and realizing a transmission capacity which causes the effective transmission delay time to a value enough to be tolerable with regard to the maximum number $n_{max}$ of wireless terminal devices 134-1 through 134-n and the amount of transmission information (the number of packets) that can be transmitted and received by the wireless terminal devices 134-1 through 134-n in the busiest situation. It is assumed that the number of shared channels is equal to 1 in the following description for the sake of simplicity.

It is also assumed that the multiple access method applied to the physical layer among the multiple access methods is CDMA (Code Division Multiple Access) of direct sequence spreading type. It is further assumed that CSMA/CA (Carrier Sense Multiple Access/Collision Avoidance) is applied to the data link layer, CSMA/CA enabling the wireless terminal devices 134-1 through 134-n to asynchronously transmit signals and having a capability of forming a link based on a datagram scheme.

The base station devices 113-1 through 113-M make an interface between the shared channel and the communication links 132.

The wireless interface units 111-1 through 111-n (not shown) and the controllers 112-1 through 112-n of the wireless terminal devices 134-1 through 134-n make interfaces between the communication links 132 and the terminal interface units 139-1 through 139-n.

The controller 112 of the wireless terminal device 134 performs a predetermined initialization process when the wireless terminal device 134 is attached to the PCMCIA slot of the personal computer 135 and a supply of driving electricity to the personal computer 135 is started (step (1) of FIG. 10A, and step (1) of FIG. 11).

Further, after completing the initialization process, the controller 112 activates the wireless interface unit 111 without acknowledging the aforementioned call request supplied by the personal computer 135 (step (2) of FIG. 11). Thereby, a path is formed between the antenna 140 and the personal computer 135 via the wireless interface unit 111 and the terminal interface unit 139 (step (3) of FIG. 11).

The controller 112 and the wireless interface unit 111 interact with the base station device forming the zone in which the wireless terminal device 134 of interest is located, and perform the following process. It is assumed that the above base station device is one indicated by the reference number 113-1. The shared channel is used instead of the control channel to be used at the time of normal calling and call acknowledgement. The predetermined control information is sent to and received from the base station device 113-1 via the shared channel unless control information indicating "should shift to another wireless channel" is supplied from the base station device 113-1 via the shared channel. Thus, the following are carried out via the shared channel: transmission of the registration request to the base station device 113-1, transmission and reception of authentication and secret-speech key, and reception of the reception acknowledgement in the same sequence as that used in the aforementioned related art (steps (4)–(6) of FIG. 11).

It is assumed that the structures and formats of the registration request, control information, and registration acknowledgement are the same as those used in the related art for the sake of simplicity.

The base station device 113-1 performs channel setting under the control of the base station control device 133 connected via the communication link 132.

However, the controller 138A of the base station control device 133 does not allocate a wireless channel to be presented for transmission of a speech signal to the call generated in response to the call request in the process of channel setting, but allocates such a wireless channel by interacting with the node device 151 which the base station control device 133 faces via the communication link 170 as in the case of the related art.

Further, in the process of channel setting and call setting, the controller 138A of the base station control device 133 makes, via the BSI 136 and the CNI 137, the interface between the communication link 170 and the link formed based on the CSMA/CA between the wireless terminal device 134 and the base station device 113-1 via the shared channel.

Figure 3:
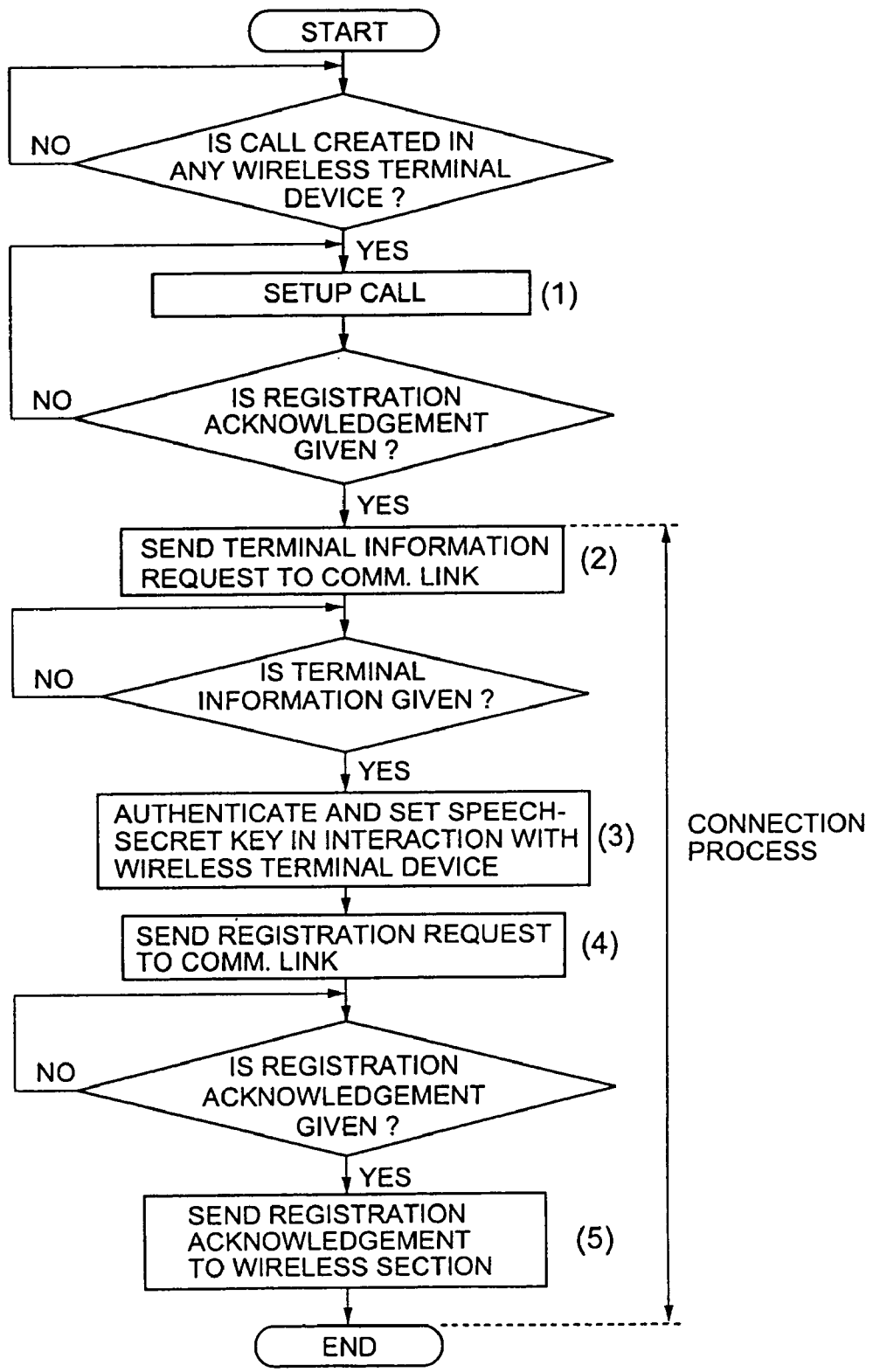
FIG. 3 is a flowchart of an operation of a base station control device shown in FIG. 1.
Figure 4:
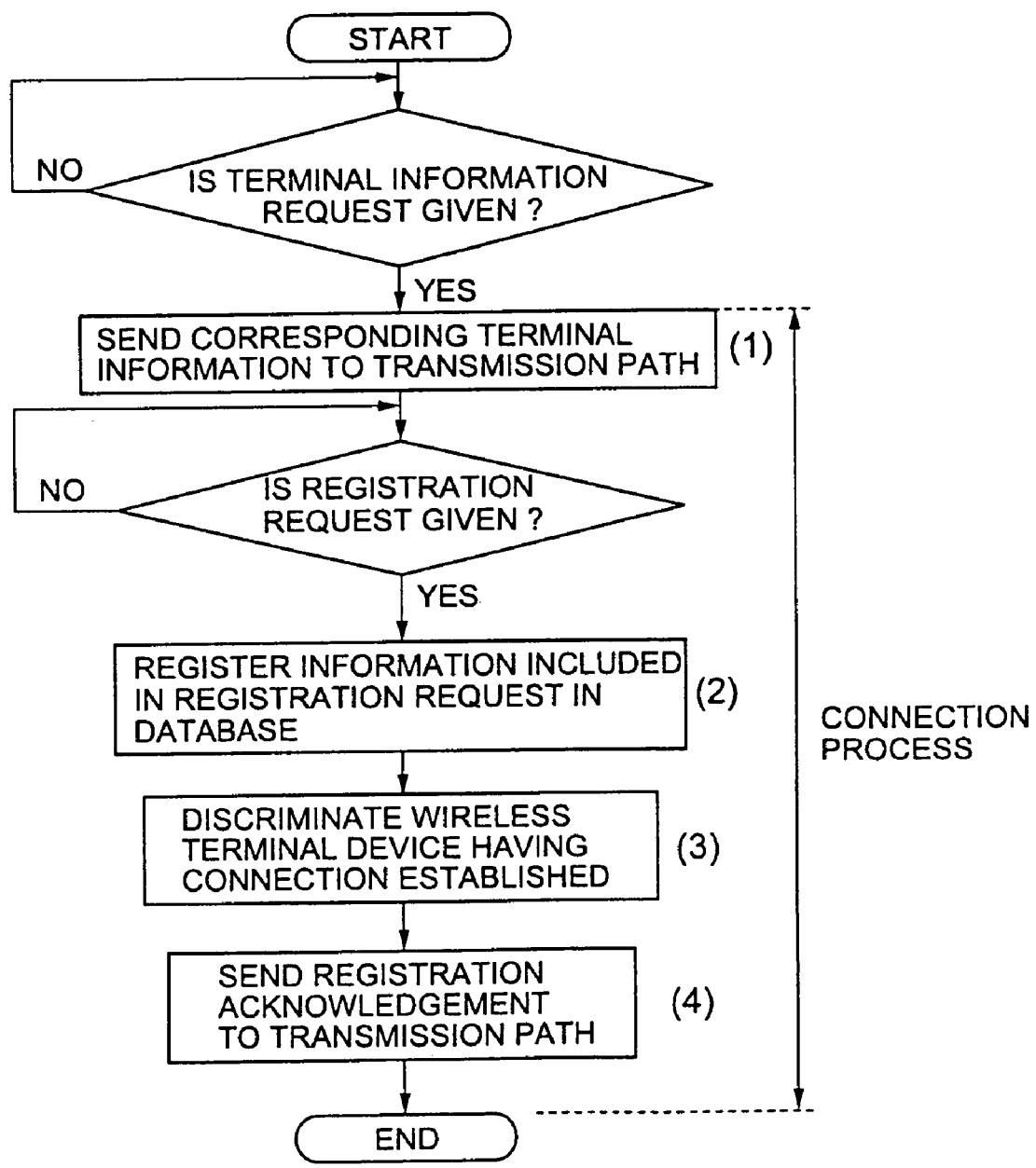
FIG. 4 is a flowchart of an HLR shown in FIG. 1.
Figure 5:
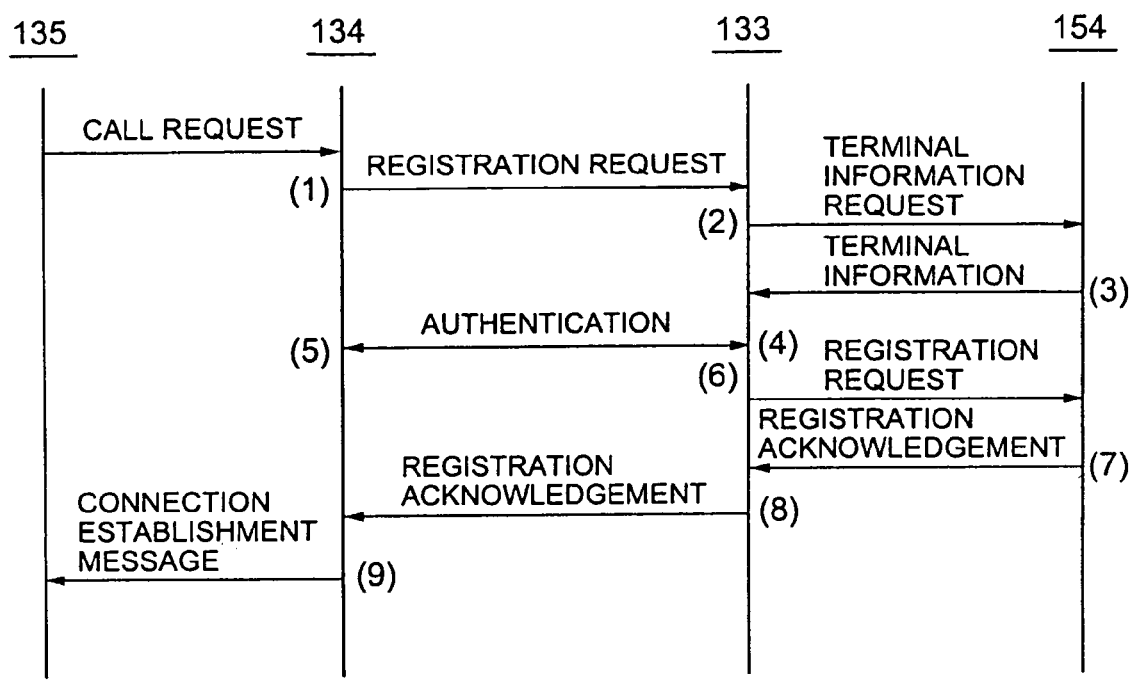
FIG. 5 is a sequence of an operation of the communication system shown in FIG. 1.
Figure 6:
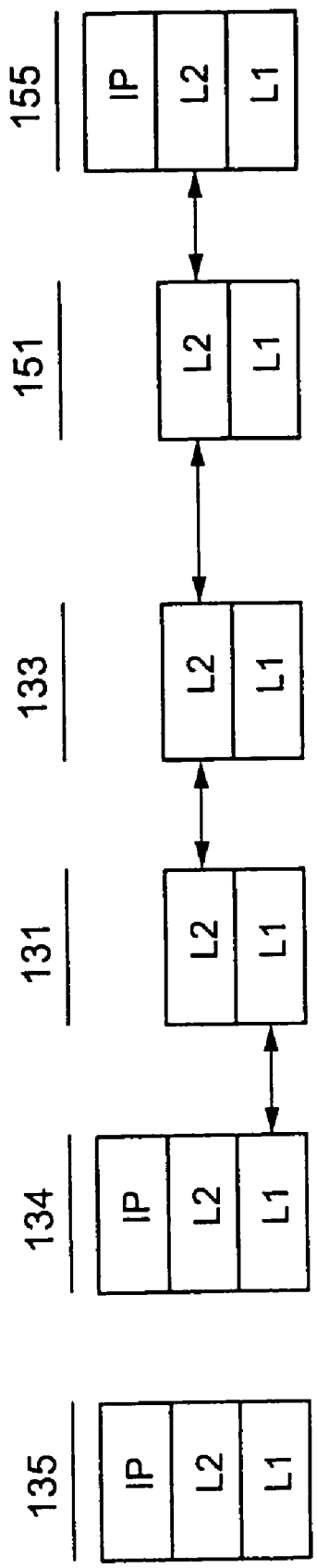
FIG. 6 is a diagram of a protocol stack used in the communication system shown in FIG. 1.

The functions and interactions of the base station control device 133, and the node devices 151, 153-1 through 153-N, HLR 154 and DF 155 connected to the base station control device 133 via the communication link 170 are the same as those used in the related art (steps (2) and (4) of FIG. 3, steps (1)–(4) of FIG. 4, and steps (2), (3), (6) and (7) of FIG. 5).

The registration acknowledgement sent out to the transmission path 152 by from the HLR 154 is transported to the base station control device 133 as in the case of the related art.

The controller 138A of the base station control device 133 gives the registration acknowledgement to the wireless terminal device 134 via the link formed on the shared channel based on CSMA/CA.

In the wireless terminal device 134, the controller 112 acquires the registration acknowledgement via the wireless interface unit 111 and recognizes it. Then, the controller 112 forms a path between the personal computer 135 and the link (antenna 140) on the shared channel via the terminal interface unit 139 and the wireless interface unit 111 (step (7) of FIG. 11). Then, the controller 112 sends the connection establishment message to the personal computer 135 via the terminal interface unit 139 (step (8) of FIG. 11).

The personal computer 135 recognizes the connection establishment message thus sent thereto, and starts to communicate with the wireless terminal device 134 while sending and receiving desired transmission information in the formation of a train of IP packets.

As described above, according to the first embodiment of the present invention, the wireless terminal devices 134-1 through 134-n spontaneously form the links on the shared channel when initialized, and interact with the base station devices 113-1 through 113-M, the base station control device 133, the node device 151, and the HLR 154 via the links. Thereby, the process (steps (4)–(8) of FIG. 11) equivalent to the connection process performed in the related art is performed. Thus, the communication paths are reserved as the links on the shared channel. In the wireless sections of the communication paths, the shared channel can be accessed based on CSMA/CA when the wireless terminal devices 134-1 through 134-n send transmission information (packets).

Thus, the wireless terminal devices 134-1 through 134-n can receive connection-oriented communication services with a desired transmission quality without individually continuing to capture dedicated wireless channels.

The wireless terminal devices 134-1 through 134-n are notified of the shared channel as known information.

Alternatively, the base station devices 113-1 through 113-M may be informed of the shared channel in such a way that the base station control device 133 broadcasts the signal indicative of the shared channel. The wireless terminal devices 134-1 through 134-n identify the shared channel by referring to the broadcasted signal.

In the first embodiment of the present invention, the shared channel is a single physical channel having a transmission capacity which covers the number of wireless terminal devices to be concurrently supplied with the connection-oriented communication services and the maximum amount of transmission information transmitted and received by each wireless terminal device.

However, the shared channel may be given as a set of shared channels each having given transmission capacities.

Further, the shared channel used to form the links separately by the wireless terminal devices 134-1 through 134-n using the shared channel may be adaptively allocated by the base station control device 133 in accordance with the predetermined channel setting sequence.

FIG. 13 is a flowchart of an operation of the base station control device according to a second embodiment of the present invention. A description will be given, with reference to FIGS. 1, 2, 9, 10 and 13, of an operation of the second embodiment of the present invention.

The second embodiment of the present invention differs from the first embodiment thereof in that the controller 112 of the wireless terminal device 134 and the controller 138A of the base station control device 133 execute the following processes in the connection process.

In the base station control device 133, the controller 138A is supplied with the registration acknowledgement from the HLR 154 in the connection process (step (3) of FIG. 10A), and then sends the registration acknowledgement to the wireless terminal device 134 via the wireless section (step (4) of FIG. 10A, step (1) of FIG. 13 and step (5) of FIG. 3).

However, in the process of relaying the registration acknowledgement, the controller 138A acquires and reserves, with respect to the communication link to be established between the base station control device 133 and the wireless terminal device 134, a unique DLCI (Data Link Connection Identifier) that logically indicates the above link from a communication driver performing a communication control involved in the data link layer (step (a) of FIG. 13).

For the sake of simplicity, it is assumed that the DLCI includes a service access point identifier (SAPI) that indicates the base station device 113-1 (base station control device 133) corresponding to an access point to be accessed by the wireless terminal device 134.

Further, the controller 138A adds the DLCI to the registration acknowledgement to be sent to the wireless terminal device 134 (step (b) of FIG. 13).

The controller 138A reserves a process of explicitly notifying the above-mentioned communication control driver of release as long as an event by which the continuous connection with the wireless terminal device 134 should released does not occur.

Figure 2:
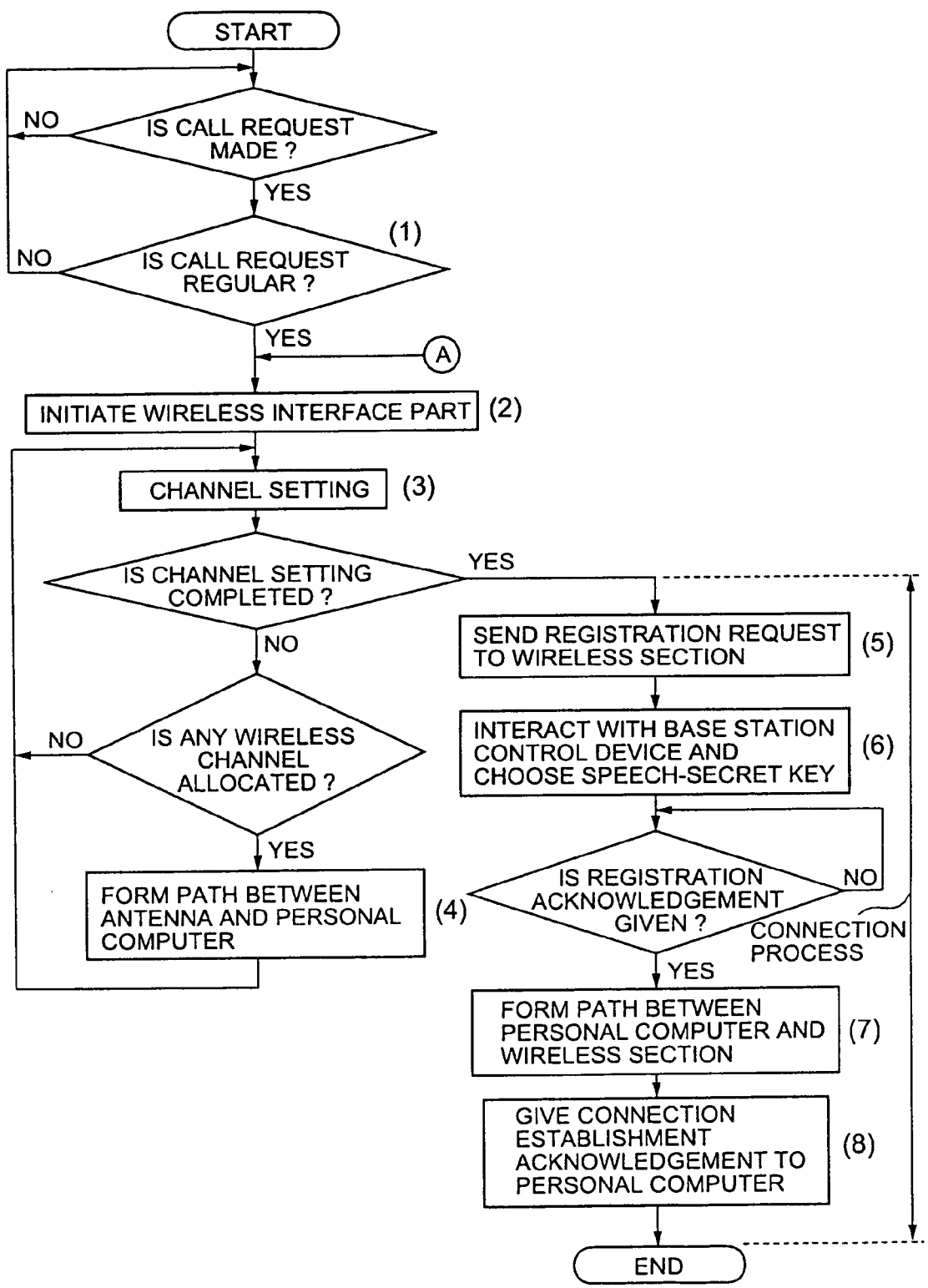
FIG. 2 is a flowchart of an operation of a wireless terminal device shown in FIG. 1.

The controller 112 of the wireless terminal device 134 recognizes the above-mentioned registration acknowledgement, and then forms a path in the same manner as that performed in the related art (step (7) shown in FIG. 2).

Further, the controller 112 extracts the DLCI included in the registration acknowledgement and retains it. Thereby, the continuous connection can be maintained at the data link layer in addition to the physical layer. The controller 112 sends out the connection establishment message indicating the above and addressed to the personal computer 135 (step (8) of FIG. 2).

That is, the DLCK, which is a resource of the data link layer, is reserved between the wireless terminal device 134 and the base station device 113-1 in addition to the resources of the physical layer. Thus, the wireless transmission path (link) to be presented for continuous connection can be formed.

Thus, according to the second embodiment of the present invention, it is possible to maintain high transmission efficiency and reduce transmission delay time in comparison to a case where, even when continuous connection is attained at only the physical layer, the DLCI must be adequately allocated by the communication driver at the time of transmission and reception of information.

In the above description, only the DLCI is reserved, as resources of the data link layer, together with the resources of the physical layer. However, arbitrary resources may be reserved if the resources are adaptive to the protocols applied to the data link layer or a higher layer.

As shown in FIG. 14A, according to the second embodiment of the present invention, data link layer L2 in the wireless section is terminated by the base station control device 133. Alternatively, as shown in FIG. 14B, when the data link layer L2 is terminated by the node device 151 facing the base station control device 133 via the communication link 170, the aforementioned process performed by the controller 138A of the base station control device 133 may be performed by the controller 159 of the node device 151.

Figure 15A:
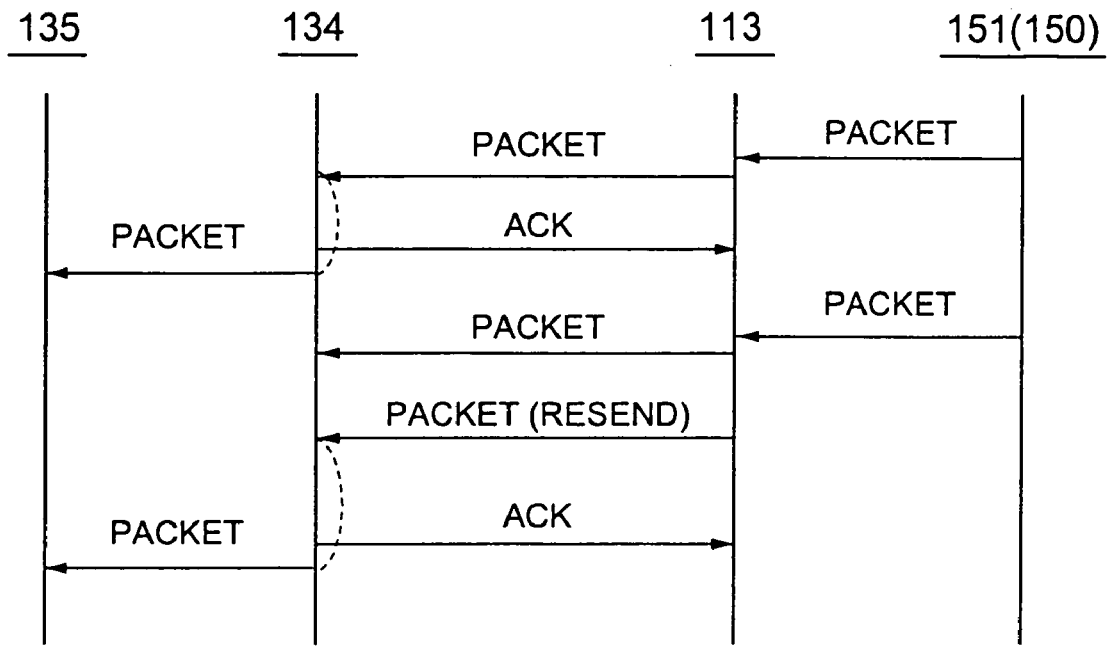
FIGS. 15A and 15B are sequence diagrams of a transmission acknowledgement performed in a wireless section.
Figure 15B:
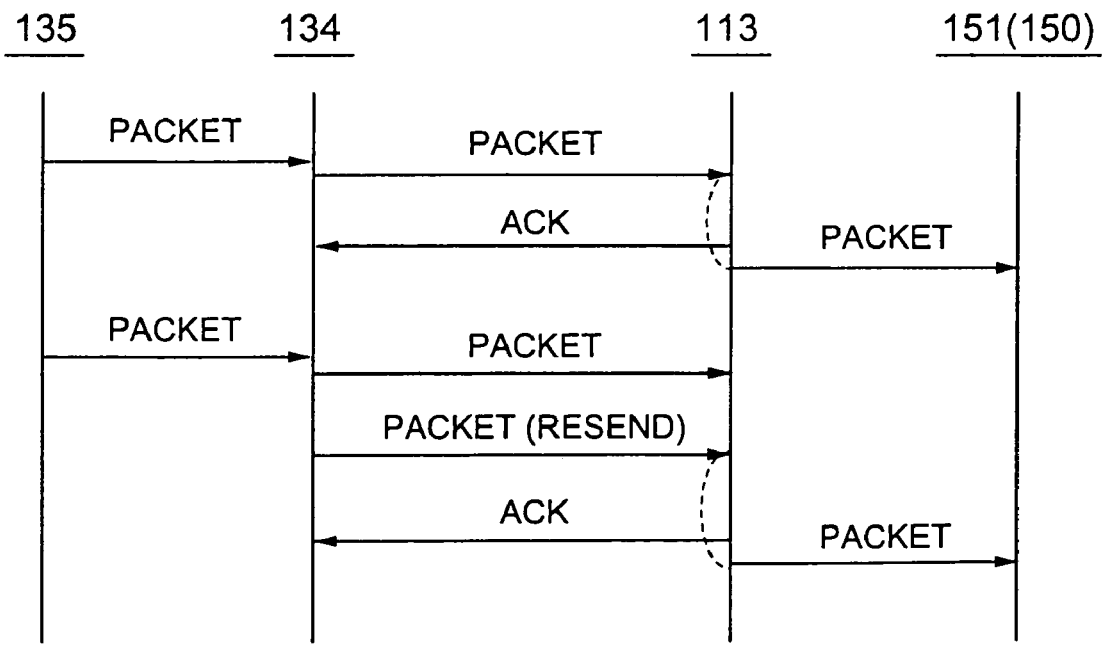

Also, the aforementioned description of the first and second embodiments of the present invention does not refer to execution of a transmission acknowledgement in the wireless section. However, as indicated by thick solid lines in FIGS. 15A and 15B, ACK that means acknowledgement of transmission may be adequately sent to the transmission source on the single or plural packet basis in any layer equal to or higher than the data link layer in one or both of the uplink and downlink between the wireless terminal device 134 and the base station control device 133.

Figure 16:
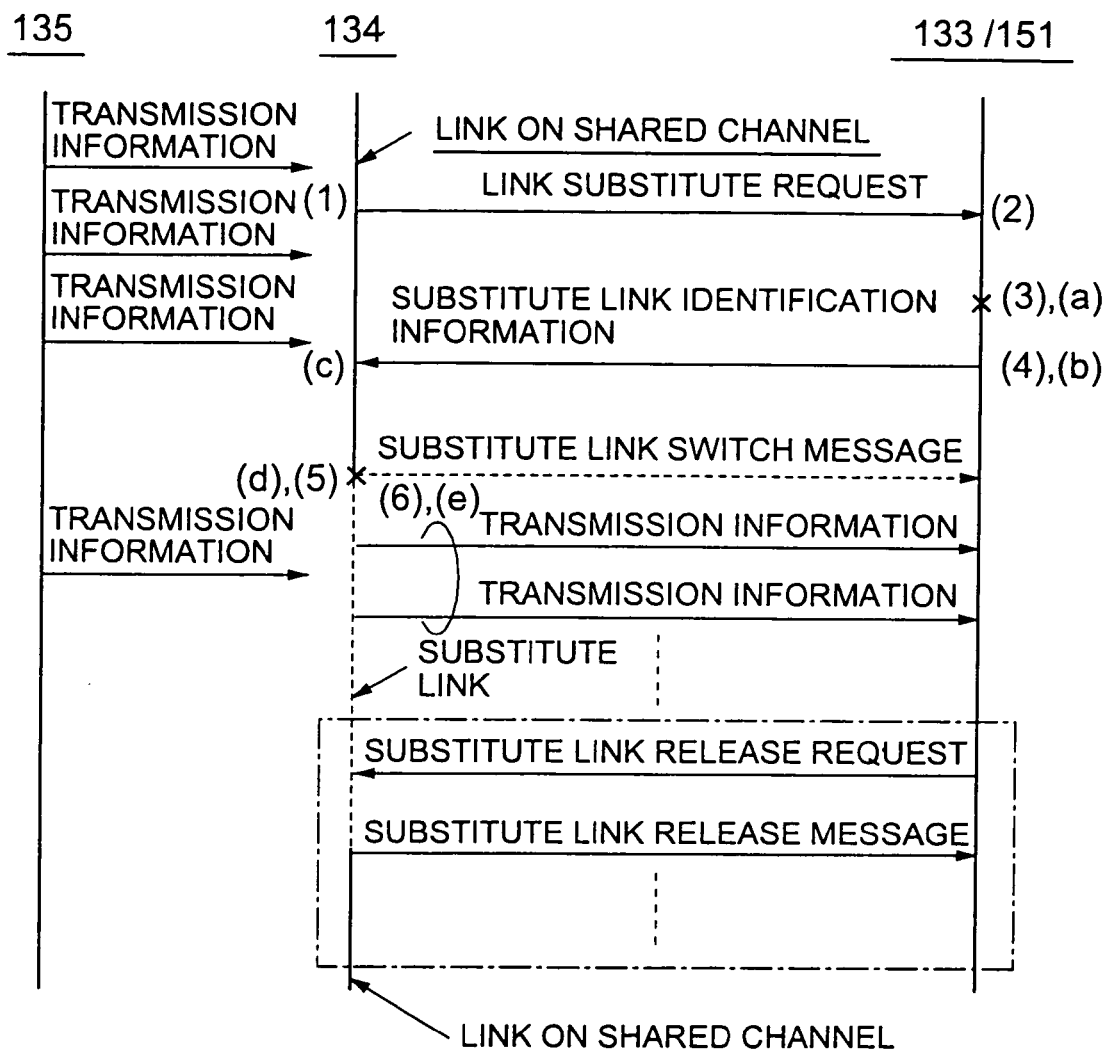
FIG. 16 is a sequence diagram an operation of a third embodiment of the present invention.
Figure 17:
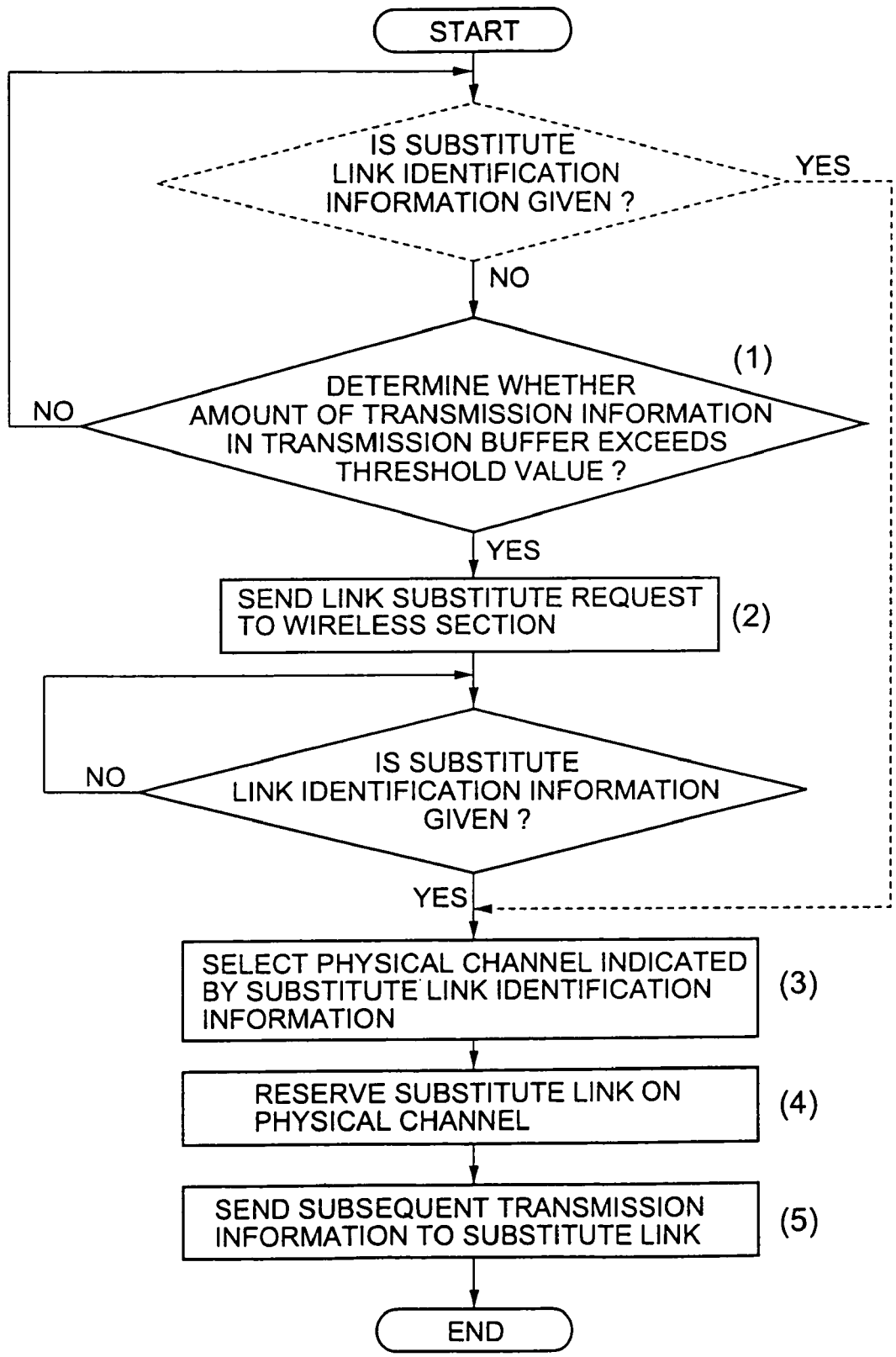
FIG. 17 is a flowchart of a wireless terminal device used in the third embodiment of the present invention.
Figure 18:
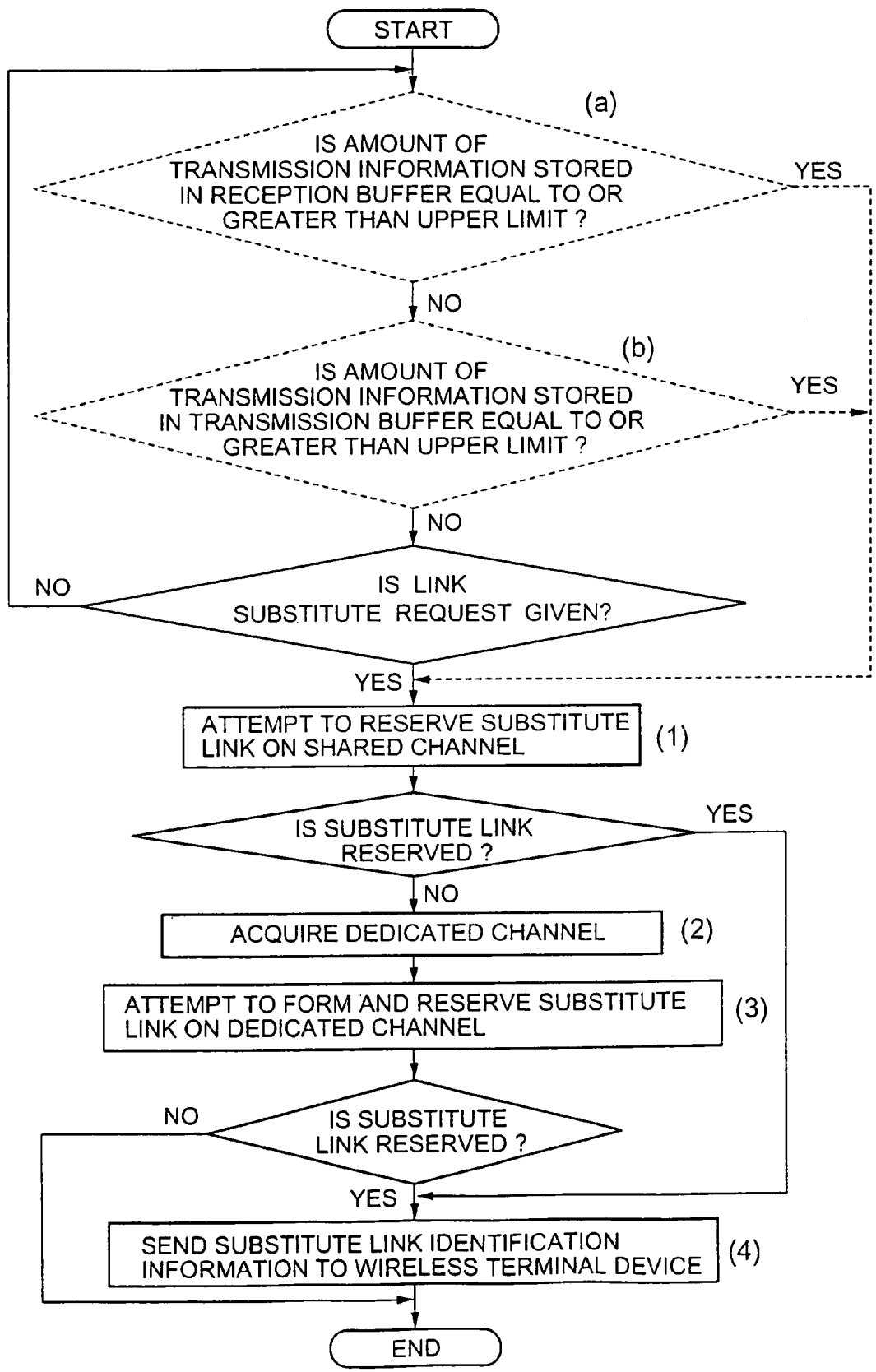
FIG. 18 is a flowchart of a base station control device used in the third embodiment of the present invention.

FIG. 16 is a sequence diagram of an operation of a third embodiment of the present invention. FIG. 17 is a flowchart of an operation of the wireless terminal device employed in the third embodiment of the present invention. FIG. 18 is a flowchart of an operation of the base station control device employed in the third embodiment of the present invention.

A description will be given, with reference to FIGS. 9, and 16 through 18, of the third embodiment of the present invention.

The third embodiment of the present invention differs from the first embodiment in that the controller 112 of the wireless terminal device 134 performs the following sequence in the process in which the personal computer 135 sends transmission information to any of terminal devices that the personal computer 135 faces via the aforementioned wireless section (here, for the sake of simplicity, it is assumed that the facing terminal is the personal computer 156 accommodated by the core network 150 via the node device 153-N).

The controller 112 acquires transmission information given by the personal computer 135 in the order of time series (it is assumed that such transmission information is given on the packet basis for the sake of simplicity), and temporarily stores it in a transmission buffer (not shown).

Further, the controller 112 sequentially sends out the packets thus obtained to the wireless transmission path (link reserved on the shared channel) based on CSMA/CA.

Furthermore, the controller 112 monitors the amount of transmission information (the number of packets) which still remains in the transmission buffer and has not yet been turned over the wireless interface unit 111. Then, the controller 112 determines whether the amount of transmission information exceeds a given threshold value that is predetermined as the upper limit which obtains a desired transmission quality and a desired transmission efficiency within the transmission capacity of the shared channel (step (1) of FIG. 17).

When the answer of the above determination is negative, the controller 112 continues to capture the link reserved on the shared channel, and sequentially sends subsequent packets to the link.

In contrast, if the answer of the determination is affirmative, the controller 112 sends a control packet (hereinafter referred to as link substitute request) to the wireless section as a process involved in the data link layer (step (1) of FIG. 16, and step (2) of FIG. 17). The link substitute request is a request for reservation of a substitute link having a larger transmission capacity than that of the already captured link.

When the controller 138A of the base station control device 133 acknowledges the link substitute request (step (2) of FIG. 16), the controller 138A attempts to reserve the substitute link on the shared channel within the reminder of the transmission capacity of the shared channel on the basis of a communication procedure applied to the data link layer, such as an LLC (Logical Link Control) or an SCOP (Service specific Connection Oriented Protocol) (step (3) of FIG. 16, and step (1) of FIG. 18).

If the controller 138A fails to reserve the substitute link, the controller 138A captures a dedicated channel which is different from the shared channel and is idle at that time (step (2) of FIG. 18). Then, the controller 138A attempts to form and reserve a substitute link on the dedicated channel (step (3) of FIG. 18).

In the process of reserving the substitute link, the operations carried out by the interaction of the parts of the base station control device 133 and the wireless terminal device 134 are basically the same as those carried out in the related art after a call is initiated in the wireless terminal device 133. Further, various known communication procedures and control may be applied. Thus, a detailed description of the interaction-based operations will be omitted here.

When the formation and reservation of the substitute link is completed, the controller 138A sends a substitute link identification information (comprised of an identifier indicative of the share channel or the dedicated channel, and the aforementioned DLCI) to the wireless terminal device 134 (step (4) of FIG. 16 and step (4) of FIG. 18).

The controller 112 acquires a new DLCI if necessary and thus reserves the substitute link (step (4) of FIG. 17), and thereafter sends the transmission information stored in the transmission buffer at that time to the substitute link (step (6) of FIG. 16 and step (5) of FIG. 18).

That is, if the amount of transmission information sent to the wireless section by the wireless terminal device 134 increases to a degree at which the desired transmission speed and quality cannot be obtained, the wireless terminal device 134 requests the base station control device 133 to allocate a substitute link, and continues to send the transmission information after the substitute link is reserved.

Hence, it is possible to avoid congestion of the shared channel before it happens and flexibly change the transmission capacity of the wireless section based on an increase in information to be transmitted.

In the above description of the third embodiment of the present invention, it is determined, based on only the amount of information to be transmitted to the wireless transmission path, whether the substitute link should be reserved.

Alternatively, it is also possible to recognize occurrence of a situation in which the substitute link should be reserved by checking the frequency of occurrence of a collision and the degree of congestion due to asynchronous transmissions by the wireless terminal devices.

Also, in the above description, only the amount of transmission information to be sent to the wireless transmission path is compared with the threshold value in order to determine whether the substitute link should be reserved. Alternatively, it is also possible to use another information such as the increasing rate of the quantity of transmission information or the type of information (may be supplied by the personal computer 135).

Further, in the above-mentioned description, the substitute link is reserved when the amount of information to be sent by the wireless terminal device 134 increases. If the amount of information becomes less than the threshold value, the substitute link is released, and it is attempted to form a link on the shared channel by the reverse of the process performed based on the aforementioned interaction. The reverse process corresponds to the aforementioned process carried out in response to the outgoing call in the related art. Thus, a description of the reverse process will be omitted here.

In the above-mentioned description of the third embodiment of the present invention, the controller 112 of the wireless terminal device 134 recognizes the status in which the substitute link should be reserved by the aforementioned manner.

Alternatively, information indicating the above status may be based on the intention of the operator applied by the personal computer 135 via the terminal interface unit 139 or an operation unit not shown.

Further, the information indicating the above status may be applied by the operator as a desired transmission capacity to be reserved for transmission or reception of subsequent information.

In the third embodiment of the present invention, the link substitute request is a request for reservation of a substitute link having a larger transmission capacity, as has been described previously, and does not include any information indicating the transmission capacity of the substitute link.

However, the controller 112 may add, to the link substitute request, the amount of information to be transmitted by the wireless terminal device 134 and information indicating a transmission capacity adaptive to the amount of transmission information. The controller 138A of the base station control device 133 is referred to as a reference presented to reservation of the substitute link.

A description will be given, with reference to FIGS. 9, and 15A through 18, of a fourth embodiment of the present invention. The fourth embodiment of the present invention is characterized in that the controller 138A of the base station control device 133 executes the following process.

The controller 138A stores transmission information (packets) received from the wireless terminal device 134 via the wireless section in a reception buffer, and then reads the stored transmission information in first-in first-out fashion.

The controller 138A monitors the amount of the transmission information stored in the reception buffer and not yet read therefrom, and discerns whether the amount of information exceeds the predetermined upper limit (step (a) of FIG. 18). If the answer of the above determination is NO, the controller 138A does not perform any particular process at all.

In contrast, if the answer of the determination is YES, as indicated by dotted lines in FIG. 18, the controller 138A reserves the substitute link on the shared channel or the dedicated channel as in the case where the link substitute request is applied by the wireless terminal device 134 in the third embodiment of the present invention ((a) and (b) of FIG. 16, and steps (1)–(4) of FIG. 18).

In the wireless terminal device 134, as shown in the broken line in FIG. 17, if the controller 112 is supplied with the substitute link identification information indicating the substitute link reserved in the base station control device 133, even if the amount of transmission information stored in the transmission buffer is less than the threshold value ((c) of FIG. 16, and step (3) of FIG. 17), the physical channel indicated by the identification information is selected as in the case of the third embodiment ((d) of FIG. 16) and step (3) of FIG. 17).

Further, the controller 112 reserves the substitute link on the above physical channel (step (4) of FIG. 17), and sends subsequent transmission information to the substitute link ((e) of FIG. 16, and step (5) of FIG. 17).

According to the fourth embodiment of the present invention, the substitute link between the base station control device 133 and the wireless terminal device 134 is formed under the communication control (channel control) primarily executed by the base station device 133.

Thus, as compared with the third embodiment of the present invention, it is possible to efficiently utilize the remainder of the process capability of the base station control device 133 and to thus ensure a high transmission quality and a high quality of service even for a heavy-traffic period on the shared channel.

A description will now be given, with reference to FIGS. 9, and 16 through 18, of a fifth embodiment of the present invention, which is characterized in that the controller 138A of the base station control device 133 performs the following process.

The controller 138A of the base station control device 133 stores, in the transmission buffer, transmission information that is supplied from the core network 150 via the CNI 137 or is generated by the controller 138A and that is to be sent to the wireless section, and reads the transmission information in first-in first-out fashion.

The controller 138A monitors the amount of transmission information which is stored in the transmission buffer and has not yet been sent to the wireless section, and determines whether the amount of the transmission information exceeds the predetermined upper limit (step (b) of FIG. 18). If the answer of the above determination is NO, the controller 138A does not perform any particular process at all.

In contrast, if the answer of the determination is YES, as indicated by the one-dot chained line shown in FIG. 18, the controller 138A reserves the substitute link on the shared channel or the dedicated channel as in the case where the link substitute request is applied by the wireless terminal device 134 in the third embodiment of the present invention ((a) and (b) of FIG. 16, and steps (1)–(4) of FIG. 18).

The controller 112 of the wireless terminal device 134 reserves the substitute link as in the case of the fourth embodiment of the present invention ((c) of FIG. 16 and steps (3) and (4) of FIG. 17), and sends subsequent transmission information to the above substitute link ((e) of FIG. 16, and step (5) of FIG. 17).

According to the fifth embodiment of the present invention, if the amount of transmission information to be sent to the wireless section from the base station control device 133 exceeds the upper limit, the base station control device 133 interacts with the wireless terminal device 134 and promptly reserves the substitute link.

Hence, it is possible to avoid congestion of the shared channel before it happens and to thus realize a high quality of transmission and a high quality of service.

In the above description of the fifth embodiment of the present invention, it is automatically determined, in the base station control device 133, whether the amount of transmission information in the reception buffer or transmission buffer exceeds the given upper limit. Then, the substitute link is formed based on the result of the above determination.

The time when the substitute link should be reserved may be directly input to the controller 138A through an operation unit or information terminal not shown. Thereby, it may be attempted to improve the efficiency and flexibility in works involved in maintenance and operation.

In the embodiments of the present invention, the substitute link is reserved when the amount of transmission information stored in the reception or transmission buffer exceeds the upper limit. Alternatively, a similar attempt may be made, for example, when the increasing rate of the amount of transmission information exceeds a given threshold value.

The upper limit used in the embodiments of the present invention can be related to, for example, the number of packets to be received or sent as transmission information or the total of the amounts of transmission information included in the respective packets.

In the embodiments of the present invention, if the amount of transmission information stored in the transmission or reception buffer becomes less than the upper limit, no special process is carried out.

However, if a non-speech or voice condition continues for a given period of time after the shifting to the substitute link is completed, as indicated by hatching using a one-dot chained line in FIG. 16, given messages (a substitute link release request and a substitute link release acknowledgement in FIG. 16) may be transferred between the base station control device 133 and the wireless terminal device 134. Thus, the link shifts from the substitute link to the link on the shared channel.

The wireless terminal device 134 or the node device 151 as well as the base station control device 133 may detect the non-speech condition, release of the substitute link, and shift to the link on the shared channel.

A description will be given, with reference to FIG. 9, of a sixth embodiment of the present invention, which differs from the fifth embodiment thereof in that the reference for determining whether the substitute link should be reserved is based on neither transmission information to be sent to the wireless transmission path nor the amount of transmission information received via the wireless transmission path.

According to the sixth embodiment of the present invention, a decision as to whether the substitute link should be reserved is made based on whether the frequency of occurrence of a collision or the degree of congestion due to asynchronous transmissions by the wireless terminal devices exceeds the respective tolerable limit.

According to the sixth embodiment of the present invention, the substitute link is reserved based on the frequency of occurrence of a collision or the degree of congestion due to asynchronous transmissions by the wireless terminal devices. Thus, it is possible to promptly and definitely eliminate degradation of the transmission quality, as compared with the case where the determination is performed in the process of the communication control at the data link layer or higher.

A description will be given, with reference to FIG. 9, of a seventh embodiment of the present invention, which is different from the fifth embodiment thereof in that the situation in which the substitute link should be reserved is determined as follows.

The controller 138A of the base station control device 133 terminates the transport (TP) layer. Further, a port number conversion table including the following is stored in the main memory of the controller 138A beforehand: a port number included in the TCP header of transmission information stored in the reception or transmission buffer and indicative of service to be presented to the transmission source or destination; and the standard amount of information assigned the above port number.

Examples of the formation of an application system providing ,the above-mentioned service are a TELNET (Terminal Connection) and an FTP (File Transfer Protocol).

The controller 138A acquires the port number included in the TCP header of the transmission information stored in one of the reception buffer and the transmission buffer or both thereof, and then obtains the amount of information corresponding to the port number thus acquired and stored in the port number conversion table.

Further, the controller 138A checks the magnitude relationship between the above amount of information and the upper limit, and determines the situation in which the substitute link should be reserved. The situation in which the substitute link should be reserved is determined in advance of the time when the amount of information in the reception or transmission buffer changes greatly. It is thus possible to definitely and stably maintain a good transmission quality, as compared with the fifth embodiment of the present invention.

In the aforementioned embodiments of the present invention, as shown in FIGS. 14C and 14D, the base station control device 133 is the end point of the data link layer L2 or the network layer (IP layer), and the node device 151 is the end point of the network layer or higher.

However, a decision as to at which layers the base station control device 133 and the node device 151 should serve as end points can be arbitrarily made as long as a process equivalent to the already mentioned communication control is performed with the given interaction therebetween. In this regard, the base station control device 133 and the node devices 151, and 153-1 through 153-N can be arranged in a function distributed configuration.

The messages mutually transferred in the process of the communication control with the above interaction (the link substitute request, the substitute link identification information and so on shown in FIG. 16) can be turned over as equivalent messages by applying a standard protocol such as the resource reservation protocol or the like thereto.

In a case where the aforementioned link is adequately reserved as a resource of the data link layer and is released by application of the resource reservation protocol, the transmission quality and service quality can be highly maintained without a particular communication control based on an unusual sequence even if a large total number of base station control devices and node devices are interposed between the transmission source and the destination.

In the aforementioned embodiments of the present invention, the CMSA/CA-based link formed between the wireless terminal device 134 and the base station control device 133 is formed on the single common channel even in the case where any of the base station device 134 and the base station device 133 acts as the transmission source.

However, if a desired number of terminals can concurrently receive continuous-connection-based communication services under the control of the base station devices 113-1 through 113-M, the downlinks from the base stations 113-1 through 113-M (the base station control device 133) to the wireless communication devices may be formed on a physical channel different from the uplinks from the wireless terminal devices to the base station devices 113-1 through 113-M (the base station control device 133).

The aforementioned embodiments of the present invention employ CSMA/CA., Alternatively, if the shared channel is shared by a plurality of wireless terminal devices which/should receive communication services based on continuous connection, any of the following first through fourth systems can be applied.

The first system is a non-persistent system. A transmission is permitted if an idle physical channel is available. If no idle physical channel is available, it is determined whether an idle physical channel is available when a predetermined time elapses. Thus, the time at which transmission is permitted can be discriminated.

The second system is a 1-persistent system. A transmission is permitted if an idle physical channel is available. If not, the transmission is on standby. Then, the transmission is performed immediately when an idle physical channel becomes available.

The third system is a p-pertinent system, which differs from the 1-persistent system in that probability that transmission is performed soon after an idle physical channel becomes available is preset to p.

The fourth system is CSMA/CD, which detects a collision that happens on the physical channel, and interrupts transmission in progress when such a collision is detected. Then, the transmission is retried when a random standby time elapses.

In the embodiments of the present invention, the invention is applied to communication systems which permit the wireless terminal devices accommodated via the wireless transmission paths to access the Internet based on continuous connection.

However, the network (the core network 50) concurrently accessed by a plurality of wireless terminal devices on the continuous connection basis may be any type of network such as a LAN or an intranet.

The previously given description of the embodiments of the present invention does not specifically refer to a modulation system or a multiple access system applied to the physical layer on the shared channel or dedicated channel. As to the physical channel formed by the modulation system or multiple access system, a single carrier wave signal modulated in accordance with transmission information, and transmitted as a burst wave, can be used. Alternatively, the CDMA of direct sequence spreading type can be used.

In the embodiments of the present invention, a radio frequency (RF) signal is used as the carrier wave signal of the physical channel. Alternatively, it is possible to use an infrared signal or an ultrasonic wave signal.

The communication sequence applied to a layer higher than the transport layer may be any sequence or protocol which matches communication services based on the continuous connection basis. For example, the aforementioned FTP (File Transfer Protocol) or SMTP (Simple Mail Transfer Protocol) may be used.

The wireless terminal device 134 may inform the base station control device 133 that the shift to the substitute link is completed. However, as the dotted line shown in FIG. 16, a substitute link shift message as indicated by a dotted line in FIG. 16 may be used, if the base station control device 133 is required to definitely determine the time at which the wireless terminal device 134 shifts to the substitute link.

The present invention is not limited to the specifically disclosed embodiments, and variations and modifications may be made without departing from the scope of the invention.

What is claimed is:

1. A wireless terminal device comprising:
   a wireless interface part having an interface with a wireless transmission path at a physical layer;
   a link forming part accessing the wireless transmission path via the wireless interface part and forming a particular link on the wireless transmission path;
   a transmission/reception part transmitting and/or receiving transmission information via the particular link formed by the link forming part; and
   a transmission information monitoring part for monitoring, for each link, the amount of the transmission information handled by the transmission/reception part, or an increasing rate of the amount of the transmission information,
   the wireless transmission path being formed as a physical channel to which a CSMA system is applied, the CSMA system securing a given transmission quality with respect to a total of a number of links concurrently formable and an amount of the transmission information,
   the link forming part forming the particular link on the wireless transmission path, the particular link sharing the wireless transmission path with one or more additional links each associated with an additional wireless terminal device, the particular link and the one or more additional links each being formed with an initialization of the wireless transmission path and persisting while the wireless transmission path remains active, and
   the link forming part change, as to the particular link formed in advance, a transmission capacity to a value which ensures a predetermined transmission quality in accordance with the amount of the transmission information or the increasing rate monitored by the transmission information monitoring part, and alternatively substituting another link having another transmission capacity greater than that of the particular link.

2. The wireless terminal device as claimed in claim 1, wherein the link forming part captures resources of a single or a plurality of upper layers including a data link layer in accordance with the physical layer of the wireless transmission path at the time of the forming of the particular link.

3. The wireless terminal device as claimed in claim 1, further comprising a man-machine interface part providing, based on a man-machine interface, an input which requests to change the transmission capacity of the particular link formed by the link forming part in advance or to substitute another link for the particular link,
wherein, when said input is provided by the man-machine interface part, the transmission capacity of the particular link formed in advance is changed to a value which ensures a given transmission quality, or the particular link is replaced by said another link having a transmission capacity greater than that of the particular link.

4. The wireless terminal device as claimed in claim 1, further comprising a physical channel monitoring part monitoring one or both of a degree of congestion in a physical channel and a frequency of occurrence of a collision in the physical channel in CDMA, wherein the link forming part replaces the particular link by another link ensuring a given transmission capacity on the basis of said one or both of the degree of congestion in the physical channel and the frequency of occurrence of a collision in the physical channel.

5. A node device comprising:
a wireless interface part having, at a physical layer, an interface with wireless transmission paths via which wireless terminal devices are accommodated;
a link forming part forming, in connection with a connectionless communication sequence, individual links respectively corresponding to the wireless terminal devices via the wireless interface part;
a transmission/reception part transmitting and/or receiving desired transmission information via the individual links formed by said link forming part; and
a transmission information monitoring part which monitors, for each of the individual links, the amount of transmission information received by the transmission/reception part or an increasing rate of the amount of the transmission information received,
wherein the link forming part forms the individual links corresponding to the wireless terminal devices, the individual links being associated in a shared manner with ones of the wireless transmission paths, formed with initialization of the ones of the wireless transmission paths and persisting while the ones of the wireless transmission paths remain active, and
wherein the link forming part changes, for each of the individual links formed in advance, a transmission capacity to a value which ensures a predetermined transmission quality in accordance with the amount of the transmission information or the increasing rate monitored by the transmission information monitoring part, and alternatively substitutes another link having another transmission capacity greater than that of a corresponding one of the individual links.

6. The node device as claimed in claim 5, further comprising a transmission information monitoring part which monitors, for each of the individual links, the amount of transmission information transmitted or to be transmitted by the transmission/reception part or an increasing rate of the amount of the transmission information,
wherein the link forming part changes, for each of the individual links formed in advance, a transmission capacity to a value which ensures a predetermined transmission quality in accordance with the amount of the transmission information or the increasing rate monitored by the transmission information monitoring part, and alternatively substitutes another link having another transmission capacity greater than that of a corresponding one of the individual links.

7. The node device as claimed in claim 5, further comprising a man-machine interface part providing, based on a man-machine interface, an input which requests to change the transmission capacity of one of the individual links formed by the link forming part in advance or to substitute another link for one of the individual links,
wherein, when said input is provided by the man-machine interface part, the transmission capacity of one of the individual links formed in advance is changed into a value which ensures a given transmission quality, or said one of the individual links is replaced by said another link having a transmission capacity greater than that of said one of the individual links.

8. The node device as claimed in claim 5, wherein the transmission information monitoring part monitors, as to one or both of transmission information transmitted or to be transmitted by the transmission/reception part and transmission information received thereby, the amount of the transmission information on a transmission unit basis, or an increasing rate of the amount of the transmission information.

9. The node device as claimed in claim 5, further comprising a physical channel monitoring part monitoring one or both of a degree of congestion in the physical channel and a frequency of occurrence of a collision in the physical channel in CDMA,
wherein the link forming part replaces one of the individual links by another link ensuring a given transmission capacity on the basis of said one or both of the degree of congestion in the physical channel and the frequency of occurrence of a collision in the physical channel.

10. The node device as claimed in claim 5, further comprising:
a memory part which stores an amount of transmission information assigned a port number, which is added to the transmission information transmitted or received at a transport layer or a higher layer and corresponds to one or both of a transmission source of the transmission formation and a destination thereof; and
a port number monitoring part which acquires the port number added to the transmission information transmitted or received,
wherein the link forming part changes, based on the amount of transmission information stored in the memory part and related to the port number acquired by the port number monitoring part, a transmission capacity of one of the individual links formed in advance to a value which ensures a predetermined transmission quality in accordance with the amount of the transmission information or the increasing rate monitored by the transmission information monitoring part, and alternatively substitutes another link having another transmission capacity greater than that of one of the individual links.

11. The node device as claimed in claim 5, wherein, as to the particular link formed in advance, the link forming part communicates with the wireless terminal device via the wireless interface part and a wireless transmission path so that control information necessary for changing a transmission capacity or substituting another link for one of the individual links is transferred therebetween, whereby the link forming part primarily changes the transmission capacity or substitutes another link for one of the individual links.

12. The node device as claimed in claim 5, wherein the wireless terminal devices are that as claimed in claim 1.

* * * * *